US009807666B2

(12) United States Patent
Dang

(10) Patent No.: US 9,807,666 B2
(45) Date of Patent: Oct. 31, 2017

(54) METHOD FOR SELECTING TARGET CELL AND TERMINAL

(71) Applicant: Huawei Technologies Co., Ltd., Shenzhen, Guangdong (CN)

(72) Inventor: Shujun Dang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/901,800

(22) PCT Filed: Oct. 20, 2014

(86) PCT No.: PCT/CN2014/088948
§ 371 (c)(1),
(2) Date: Dec. 29, 2015

(87) PCT Pub. No.: WO2016/061734
PCT Pub. Date: Apr. 28, 2016

(65) Prior Publication Data
US 2017/0230883 A1    Aug. 10, 2017

(51) Int. Cl.
*H04W 36/30* (2009.01)
*H04W 36/08* (2009.01)
*H04W 48/16* (2009.01)

(52) U.S. Cl.
CPC ........... *H04W 36/30* (2013.01); *H04W 36/08* (2013.01); *H04W 48/16* (2013.01)

(58) Field of Classification Search
CPC ...... H04W 36/30; H04W 36/08; H04W 48/16
(Continued)

(56) References Cited

U.S. PATENT DOCUMENTS

| 5,722,072 A | 2/1998 | Crichton et al. |
| 6,064,890 A | 5/2000 | Hirose et al. |

(Continued)

FOREIGN PATENT DOCUMENTS

| CN | 1889770 A | 1/2007 |
| CN | 102037763 A | 4/2011 |

(Continued)

OTHER PUBLICATIONS

"3rd Generation Partnership Project; Technical Specification Group Core Network and Terminals; Mobile radio interface signalling layer 3; General aspects (Release 12)", 3GPP TS 24.007 V12.0.0, Jun. 2013, 149 pages.

(Continued)

*Primary Examiner* — Khai M Nguyen

(57) ABSTRACT

Embodiments of the present invention disclose a method for selecting a target cell and a terminal, comprising: acquiring, by a terminal, signal strengths of a serving cell and signal strengths of neighboring cells according to a predetermined time period; determining a candidate target cell set, where the candidate target cell set includes neighboring cells whose first strength parameters are greater than a first strength parameter of the serving cell at a specific moment; detecting signal change trends, which are within a predetermined time length before the specific moment, of the neighboring cells in the candidate target cell set; determining that a neighboring cell in a set of neighboring cells whose signal change trends satisfy a first state in the candidate target cell set is a target cell, where the first state is a stable trend and/or an ascending trend; and reselecting the target cell as a serving cell.

18 Claims, 9 Drawing Sheets

(58) Field of Classification Search
USPC .............................. 455/436, 437, 438, 550.1
See application file for complete search history.

(56) References Cited

U.S. PATENT DOCUMENTS

| | | | | |
|---|---|---|---|---|
| 9,253,690 | B2* | 2/2016 | Wan | H04W 36/0061 |
| 2009/0312014 | A1* | 12/2009 | Su | H04W 36/26 |
| | | | | 455/432.1 |
| 2009/0318140 | A1* | 12/2009 | Gamel | H04W 36/30 |
| | | | | 455/432.1 |
| 2010/0309887 | A1* | 12/2010 | Kim | H04W 36/0077 |
| | | | | 370/332 |
| 2011/0032815 | A1 | 2/2011 | Kikuchi | |
| 2012/0015685 | A1 | 1/2012 | Kago et al. | |
| 2012/0202556 | A1* | 8/2012 | Mori | H04W 36/30 |
| | | | | 455/525 |
| 2014/0185469 | A1 | 7/2014 | Marmolejo-Meillon et al. | |

FOREIGN PATENT DOCUMENTS

| | | |
|---|---|---|
| CN | 102572989 A | 7/2012 |
| EP | 1 091 612 A1 | 4/2001 |
| EP | 2 704 480 A1 | 3/2014 |
| JP | H10191419 A | 7/1998 |
| JP | 2002027518 A | 1/2002 |
| JP | 2010050898 A | 3/2010 |
| JP | 2012095314 A | 5/2012 |
| JP | 2013090203 A | 5/2013 |
| WO | WO 2009/041791 A2 | 4/2009 |

OTHER PUBLICATIONS

"3rd Generation Partnership Project; Technical Specification Group Core Network and Terminals; Mobile radio interface Layer 3 specification; Core network protocols; Stage 3 (Release 12)", 3GPP TS 24.008 V12.7.0, Sep. 2014, 673 pages.

"3rd Generation Partnership Project; Technical Specification Group Core Network and Terminals; Mobile radio interface Layer 3; Supplementary services specification; General aspects (Release 12)", 3GPP TS 24.010 V12.0.0, Sep. 2014, 31 pages.

* cited by examiner

METHOD FOR SELECTING TARGET CELL AND TERMINAL

CROSS REFERENCE TO RELATED APPLICATIONS

The present application claims priority under 35 U.S.C. §365 to International Patent Application No. PCT/CN2014/088948 filed Oct. 20, 2014 which is incorporated herein by reference into the present disclosure as if fully set forth herein.

TECHNICAL FIELD

The present invention relates to the field of communications technologies, and in particular, to a method for selecting a target cell during cell reselection and a terminal.

BACKGROUND

Cell reselection is one of the most basic processes of a cellular mobile communications system. A mobile phone needs to perform cell reselection constantly while moving, so as to ensure quality of service. In the process of cell reselection, timely selection of a suitable target cell directly determines network camping performance of the mobile phone.

For a specific standard (for example, GSM), a typical cell reselection process is as follows: In order to avoid frequent ping-pong reselection, a criterion for cell reselection is to control a cell reselection behavior of a terminal by using two parameters: a hysteresis signal strength (which is usually 3 dBmV dBm) and a hysteresis time (which is usually set to 5 s). When a strength (for example, −72 dBm) of a signal received from a target cell is greater than a signal strength (−80 dBm) of a serving cell plus the hysteresis signal strength (3 dBm) and duration is greater than the hysteresis time (for example, 5 s), cell reselection is started; otherwise, the terminal continues to camp on the current serving cell.

In a scenario of high-speed movement (for example, in a network covering a high-speed train), when a user takes a fast-running automobile or train (especially a high-speed train), because a terminal moves excessively fast, cell signals may change quickly, where usually, a signal of a serving cell weakens quickly while a signal of a target cell strengthens quickly, which leads to frequent occurrences of a case like this: in a process of determining a to-be-reselected cell, a terminal already leaves a coverage area of a current serving cell before duration reaches a hysteresis time, but the determining of a to-be-reselected cell is not completed yet; and after the serving cell is unable to provide a service, the terminal has still not accessed a target cell whose signal is relatively great, and accesses the target cell only after temporary disconnection from a network, where the temporary disconnection from the network makes a user unable to enjoy a communication service or makes an ongoing communication service interrupted, which directly causes deterioration of user experience.

SUMMARY

Embodiments of the present invention provide a method for selecting a target cell and a terminal, which are used to solve a problem of frequent temporary disconnection from a network in a scenario of high-speed movement.

A first aspect of the embodiments of the present invention provides a method for selecting a target cell, including:

acquiring, by a terminal, signal strengths of a serving cell and signal strengths of neighboring cells according to a predetermined time period, where the serving cell is a cell on which the terminal currently camps, and the neighboring cells are cells from which the terminal can receive signals;

determining, by the terminal, a candidate target cell set, where the candidate target cell set includes neighboring cells whose first strength parameters are greater than a first strength parameter of the serving cell at a specific moment, where the specific moment is a latest moment when a signal strength of the serving cell and signal strengths of the neighboring cells are acquired, and the first strength parameter is a signal strength or a strength parameter obtained by calculating according to a signal strength;

detecting, by the terminal, signal change trends, which are within a predetermined time length before the specific moment, of the neighboring cells in the candidate target cell set;

determining, by the terminal, that a neighboring cell in a set of neighboring cells whose signal change trends satisfy a first state in the candidate target cell set is a target cell, where the first state is a stable trend and/or an ascending trend; and reselecting, by the terminal, the target cell as a serving cell.

With reference to the first aspect of the embodiments of the present invention, in a first implementation manner of the first aspect of the embodiments of the present invention, before the step of determining, by the terminal, that a neighboring cell in a set of neighboring cells whose signal change trends satisfy a first state in the candidate target cell set is a target cell, the method further includes:

detecting, by the terminal, a signal change trend, which is within the predetermined time length, of the serving cell; and the determining, by the terminal, that a neighboring cell in a set of neighboring cells whose signal change trends satisfy a first state in the candidate target cell set is a target cell includes:

when determining that the signal change trend of the serving cell within the predetermined time length satisfies a second state, determining, by the terminal, that the neighboring cell in the set of neighboring cells whose signal change trends satisfy the first state in the candidate target cell set is the target cell, where the second state is a stable trend and/or a descending trend.

With reference to the first implementation manner of the first aspect of the embodiments of the present invention, in a second implementation manner of the first aspect of the embodiments of the present invention, after the step of detecting, by the terminal, a signal change trend, which is within the predetermined time length, of the serving cell, the method further includes:

when determining that the signal change trend of the serving cell within the predetermined time length does not satisfy the second state, waiting, by the terminal, until a next predetermined time period to trigger the step of determining, by the terminal, a candidate target cell set.

With reference to any one of the first aspect to the second implementation manner of the first aspect of the embodiments of the present invention, in a third implementation manner of the first aspect of the embodiments of the present invention, after the step of selecting, by the terminal, neighboring cells whose first strength parameters are greater than a first strength parameter of the serving cell at a specific moment to form a candidate target cell set, the method further includes:

determining, by the terminal, whether the candidate target cell set is an empty set; and when determining that the candidate target cell set is not an empty set, triggering the step of detecting, by the terminal, signal change trends, which are within a predetermined time length before the specific moment, of the neighboring cells in the candidate target cell set; or when determining that the candidate target cell set is an empty set, waiting, by the terminal, until the next predetermined time period to trigger the step of determining, by the terminal, a candidate target cell set.

With reference to any one of the first aspect to the third implementation manner of the first aspect of the embodiments of the present invention, in a fourth implementation manner of the first aspect of the embodiments of the present invention, the determining, by the terminal, that a neighboring cell in a set of neighboring cells whose signal change trends satisfy a first state in the candidate target cell set is a target cell specifically includes:

determining, by the terminal, that a neighboring cell whose second strength parameter is the greatest in the set of neighboring cells whose signal change trends satisfy the first state in the candidate target cell set is the target cell, where the second strength parameter is a signal strength or a strength parameter obtained by calculating according to a signal strength.

With reference to the fourth implementation manner of the first aspect of the embodiments of the present invention, in a fifth implementation manner of the first aspect of the embodiments of the present invention, the determining, by the terminal, that a neighboring cell whose second strength parameter is the greatest in the set of neighboring cells whose signal change trends satisfy the first state in the candidate target cell set is the target cell includes:

selecting, by the terminal, a neighboring cell whose signal strength is the greatest from the candidate target cell set as a first neighboring cell;

determining, by the terminal, whether a signal change trend of the first neighboring cell satisfies the first state; and when determining that the signal change trend of the first neighboring cell does not satisfy the first state, removing the first neighboring cell from the candidate target cell set to update the candidate target cell set, and re-triggering the step of selecting, by the terminal, a neighboring cell whose signal strength is the greatest from the candidate target cell set as a first neighboring cell; or when determining that the first neighboring cell satisfies the first state, determining that the first neighboring cell is the target cell.

With reference to any one of the first aspect to the fifth implementation manner of the first aspect of the embodiments of the present invention, in a sixth implementation manner of the first aspect of the embodiments of the present invention, before the step of acquiring, by a terminal, signal strengths of a serving cell and signal strengths of neighboring cells according to a predetermined time period, the method further includes:

determining, by the terminal, whether the terminal is in a high-speed motion state; and when determining that the terminal is in the high-speed motion state, triggering the step of acquiring, by a terminal, signal strengths of a serving cell and signal strengths of neighboring cells according to a predetermined time period.

With reference to the sixth implementation manner of the first aspect of the embodiments of the present invention, in a seventh implementation manner of the first aspect of the embodiments of the present invention, the determining, by the terminal, whether the terminal is in a high-speed motion state includes:

detecting, by the terminal, a speed value of the terminal by using a sensor; and when the speed value of the terminal is greater than a predetermined speed threshold, determining that the terminal is in the high-speed motion state.

With reference to the sixth implementation manner of the first aspect of the embodiments of the present invention, in an eighth implementation manner of the first aspect of the embodiments of the present invention, the determining, by the terminal, whether the terminal is in a high-speed motion state includes:

detecting, by the terminal, whether an offset of automatic frequency control of the terminal within a preset time length is greater than a predetermined offset; and when the offset of the automatic frequency control of the terminal within the preset time length is greater than the predetermined offset, determining that the terminal is in the high-speed motion state.

A second aspect of the embodiments of the present invention provides a terminal, including:

an acquiring module, configured to acquire signal strengths of a serving cell and signal strengths of neighboring cells according to a predetermined time period, where the serving cell is a cell on which the terminal currently camps, and the neighboring cells are cells from which the terminal can receive signals;

a first determining module, configured to determine a candidate target cell set, where the candidate target cell set includes neighboring cells whose first strength parameters are greater than a first strength parameter of the serving cell at a specific moment, where the specific moment is a latest moment when a signal strength of the serving cell and signal strengths of the neighboring cells are acquired, and the first strength parameter is a signal strength or a strength parameter obtained by calculating according to a signal strength;

a first detection module, configured to detect signal change trends, which are within a predetermined time length before the specific moment, of the neighboring cells in the candidate target cell set determined by the first determining module;

a second determining module, configured to determine that a neighboring cell in a set of neighboring cells whose signal change trends, which are detected by the first detection module, satisfy a first state in the candidate target cell set is a target cell, where the first state is a stable trend and/or an ascending trend; and a reselection module, configured to reselect the target cell, which is determined by the second determining module, as a serving cell.

With reference to the second aspect of the embodiments of the present invention, in a first implementation manner of the second aspect of the embodiments of the present invention, the terminal further includes:

a second detection module, configured to detect a signal change trend, which is within the predetermined time length, of the serving cell; and a first triggering module, configured to: when it is determined that the signal change trend of the serving cell within the predetermined time length satisfies a second state, trigger the second determining module, where the second state is a stable trend and/or a descending trend.

With reference to the first implementation manner of the second aspect of the embodiments of the present invention, in a second implementation manner of the second aspect of the embodiments of the present invention, the terminal further includes:

a second triggering module, configured to: when it is determined that the signal change trend of the serving cell within the predetermined time length does not satisfy the second state, wait until a next predetermined time period to trigger the first determining module.

With reference to any one of the second aspect to the second implementation manner of the second aspect of the embodiments of the present invention, in a third implementation manner of the second aspect of the embodiments of the present invention, the terminal further includes:

a first judging module, configured to determine whether the candidate target cell set is an empty set;

a third triggering module, configured to: when it is determined that the candidate target cell set is not an empty set, trigger the first detection module; and a fourth triggering module, configured to: when it is determined that the candidate target cell set is an empty set, wait until the next predetermined time period to trigger the first determining module.

With reference to any one of the second aspect to the third implementation manner of the second aspect of the embodiments of the present invention, in a fourth implementation manner of the second aspect of the embodiments of the present invention, the second determining module is specifically configured to determine that a neighboring cell whose second strength parameter is the greatest in the set of neighboring cells whose signal change trends satisfy the first state in the candidate target cell set is the target cell, where the second strength parameter is a signal strength or a strength parameter obtained by calculating according to a signal strength.

With reference to the fourth implementation manner of the second aspect of the embodiments of the present invention, in a fifth implementation manner of the second aspect of the embodiments of the present invention, the second determining module specifically includes:

a selection unit, configured to select a neighboring cell whose signal strength is the greatest from the candidate target cell set as a first neighboring cell;

a judging unit, configured to determine whether a signal change trend of the first neighboring cell satisfies the first state;

a triggering unit, configured to: when it is determined that the signal change trend of the first neighboring cell does not satisfy the first state, remove the first neighboring cell from the candidate target cell set to update the candidate target cell set, and re-trigger the selection unit; and a determining unit, configured to: when it is determined that the first neighboring cell satisfies the first state, determine that the first neighboring cell is the target cell.

With reference to any one of the second aspect to the fifth implementation manner of the second aspect of the embodiments of the present invention, in a sixth implementation manner of the second aspect of the embodiments of the present invention, the terminal further includes:

a second judging module, configured to determine whether the terminal is in a high-speed motion state; and a fifth triggering module, configured when it is determined that the terminal is in the high-speed motion state, trigger the acquiring module.

With reference to the sixth implementation manner of the second aspect of the embodiments of the present invention, in a seventh implementation manner of the second aspect of the embodiments of the present invention, the second judging module is specifically configured to detect a speed value of the terminal by using a sensor, and when the speed value of the terminal is greater than a predetermined speed threshold, determine that the terminal is in the high-speed motion state.

With reference to the sixth implementation manner of the second aspect of the embodiments of the present invention, in an eighth implementation manner of the second aspect of the embodiments of the present invention, the second judging module is specifically configured to detect whether an offset of automatic frequency control of the terminal within a preset time length is greater than a predetermined offset; and when the offset of the automatic frequency control of the terminal within the preset time length is greater than the predetermined offset, determine that the terminal is in the high-speed motion state.

A third aspect of the embodiments of the present invention provides a terminal, including:

an input apparatus, an output apparatus, a processor, and a memory, where by invoking an operation instruction stored in the memory, the processor is configured to perform the following steps:

acquiring signal strengths of a serving cell and signal strengths of neighboring cells according to a predetermined time period, where the serving cell is a cell on which the terminal currently camps, and the neighboring cells are cells from which the terminal can receive signals;

determining a candidate target cell set, where the candidate target cell set includes neighboring cells whose first strength parameters are greater than a first strength parameter of the serving cell at a specific moment, where the specific moment is a latest moment when a signal strength of the serving cell and signal strengths of the neighboring cells are acquired, and the first strength parameter is a signal strength or a strength parameter obtained by calculating according to a signal strength;

detecting signal change trends, which are within a predetermined time length before the specific moment, of the neighboring cells in the candidate target cell set;

determining that a neighboring cell in a set of neighboring cells whose signal change trends satisfy a first state in the candidate target cell set is a target cell, where the first state is a stable trend and/or an ascending trend; and reselecting the target cell as a serving cell.

With reference to the third aspect of the embodiments of the present invention, in a first implementation manner of the third aspect of the embodiments of the present invention, the processor further performs the following step:

detecting a signal change trend, which is within the predetermined time length, of the serving cell; and the processor specifically performs the following step:

when determining that the signal change trend of the serving cell within the predetermined time length satisfies a second state, determining, by the terminal, that the neighboring cell in the set of neighboring cells whose signal change trends satisfy the first state in the candidate target cell set is the target cell, where the second state is a stable trend and/or a descending trend.

With reference to the first implementation manner of the third aspect of the embodiments of the present invention, in a second implementation manner of the third aspect of the embodiments of the present invention, the processor further performs the following step:

when determining that the signal change trend of the serving cell within the predetermined time length does not satisfy the second state, waiting until a next predetermined time period to trigger the step of determining a candidate target cell set.

With reference to any one of the third aspect to the second implementation manner of the third aspect of the embodiments of the present invention, in a third implementation manner of the third aspect of the embodiments of the present invention, the processor further performs the following steps:

determining whether the candidate target cell set is an empty set; and when determining that the candidate target cell set is not an empty set, triggering the step of detecting signal change trends, which are within a predetermined time length before the specific moment, of the neighboring cells in the candidate target cell set; or when determining that the candidate target cell set is an empty set, waiting until the next predetermined time period to trigger the step of determining a candidate target cell set.

With reference to any one of the third aspect to the third implementation manner of the third aspect of the embodiments of the present invention, in a fourth implementation manner of the third aspect of the embodiments of the present invention, the processor specifically performs the following step:

determining that a neighboring cell whose second strength parameter is the greatest in the set of neighboring cells whose signal change trends satisfy the first state in the candidate target cell set is the target cell, where the second strength parameter is a signal strength or a strength parameter obtained by calculating according to a signal strength.

With reference to the fourth implementation manner of the third aspect of the embodiments of the present invention, in a fifth implementation manner of the third aspect of the embodiments of the present invention, the processor specifically performs the following steps:

selecting a neighboring cell whose signal strength is the greatest from the candidate target cell set as a first neighboring cell;

determining whether a signal change trend of the first neighboring cell satisfies the first state; and when determining that the signal change trend of the first neighboring cell does not satisfy the first state, removing the first neighboring cell from the candidate target cell set to update the candidate target cell set, and re-triggering the step of selecting a neighboring cell whose signal strength is the greatest from the candidate target cell set as a first neighboring cell; or when determining that the first neighboring cell satisfies the first state, determining that the first neighboring cell is the target cell.

With reference to any one of the third aspect to the fifth implementation manner of the third aspect of the embodiments of the present invention, in a sixth implementation manner of the third aspect of the embodiments of the present invention, the processor further performs the following steps:

determining whether the terminal is in a high-speed motion state; and when determining that the terminal is in the high-speed motion state, triggering the step of acquiring signal strengths of a serving cell and signal strengths of neighboring cells according to a predetermined time period.

With reference to the sixth implementation manner of the third aspect of the embodiments of the present invention, in a seventh implementation manner of the third aspect of the embodiments of the present invention, the processor specifically performs the following steps:

detecting a speed value of the terminal by using a sensor; and when determining that the speed value of the terminal is greater than a predetermined speed threshold, determining that the terminal is in the high-speed motion state.

With reference to the sixth implementation manner of the third aspect of the embodiments of the present invention, in an eighth implementation manner of the third aspect of the embodiments of the present invention, the processor specifically performs the following steps:

detecting whether an offset of automatic frequency control of the terminal within a preset time length is greater than a predetermined offset; and when determining that the offset of the automatic frequency control of the terminal within the preset time length is greater than the predetermined offset, determining that the terminal is in the high-speed motion state.

As can be seen from the foregoing technical solutions, the embodiments of the present invention have the following advantages: A terminal in the embodiments of the present invention implements reselection of a serving cell by determining signal change trends of neighboring cells. Specifically, a terminal acquires signal strengths of a serving cell and signal strengths of neighboring cells according to a predetermined time period, and selects neighboring cells whose first strength parameters are greater than a first strength parameter of the serving cell at a specific moment to form a candidate target cell set, where the first strength parameter is a signal strength or a strength parameter obtained by calculating according to a signal strength, and the specific moment is a latest moment when a signal strength of the serving cell and signal strengths of the neighboring cells are acquired, and therefore, all the neighboring cells in the candidate target cell set have relatively great signal strengths at the specific moment; and the terminal detects signal change trends, which are within a predetermined time length before the specific moment, of the neighboring cells in the candidate target cell set, and determines that a neighboring cell in a set of neighboring cells whose signal change trends satisfy a first state in the candidate target cell set is a target cell, where the first state is a stable trend and/or an ascending trend, that is, the target cell has a relatively great signal strength and the signal strength may increase continuously, and therefore, the terminal directly reselects the target cell as a serving cell without a need to determine a hysteresis time, so that the terminal can reselect a suitable target cell in time when signals change quickly, thereby improving signal quality of a network on which the terminal camps, reducing a quantity of times of temporary disconnection from a network, and increasing a call connection rate of the terminal.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Terms used herein in the descriptions of the present invention are intended to describe specific embodiments but not intended to limit the present invention.

A term "specific moment" indicates a latest moment when a signal strength of a serving cell and signal strengths of neighboring cells are acquired. For example, a terminal acquires signal strengths of a serving cell and signal strengths of neighboring cells according to a predetermined time period, assuming that the predetermined time period is 1 second and the acquiring of signal strengths of the serving cell and the neighboring cells starts from the $0^{th}$ second. As time goes on, signal strengths of the serving cell and the neighboring cells are acquired once at intervals of 1 second (for example, at the $1^{st}$ second, the $2^{nd}$ second, the $3^{rd}$ second, and the like). Assuming that a current moment is the $8^{th}$ second and the terminal acquires signal strengths of the serving cell and the neighboring cells once, the specific moment is the $8^{th}$ second in this case; assuming that a current moment is the $8.3^{th}$ second (any moment between the $8^{th}$ second and the $9^{th}$ second), the specific moment is still the $8^{th}$ second; and assuming that as time goes on, signal strengths of the serving cell and the neighboring cells are acquired once again at the $9^{th}$ second, the specific moment is the $9^{th}$ second in this case.

A term "stable trend" indicates that a signal strength is stable, that is, a change range of the signal strength is within a predetermined strength threshold, for example, the change range of the signal strength is within 2 dBmV (decibel-mV, dBm). At present, the predetermined strength threshold may also be another value or may be set according to an actual application situation, and no limitation is imposed thereon.

A term "ascending trend" indicates that a signal strength continuously increases and an increase amplitude within a specific time length exceeds a first predetermined signal strength, where the first predetermined signal strength may be set according to an actual application situation and no limitation is imposed thereon.

A term "descending trend" indicates that a signal strength continuously decreases and a decrease amplitude within a specific time exceeds a second predetermined signal strength, where the second predetermined signal strength may be set according to an actual application situation and no limitation is imposed thereon.

Figure 1:
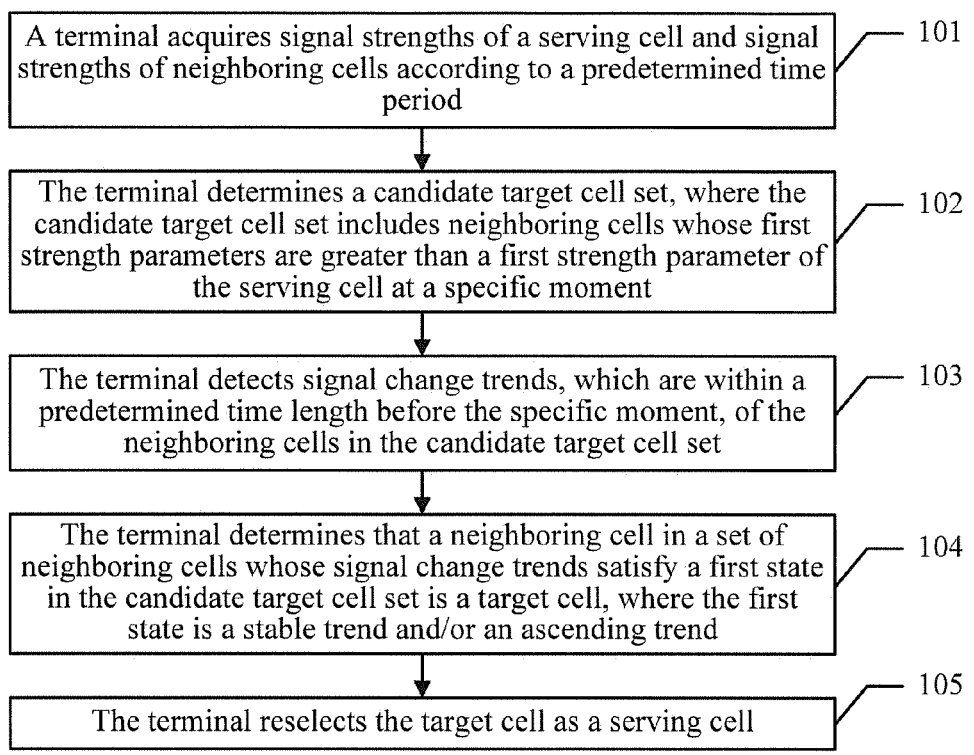
FIG. 1 is a schematic flowchart of a method for selecting a target cell according to an embodiment of the present invention.

Referring to FIG. 1, an embodiment of a method for selecting a target cell in the embodiments of the present invention includes:

101: A terminal acquires signal strengths of a serving cell and signal strengths of neighboring cells according to a predetermined time period.

When a terminal is in a normal state of camping on a network, the terminal acquires signal strengths of a serving cell and signal strengths of neighboring cells according to a predetermined time period, where the serving cell is a cell on which the terminal currently camps, and the neighboring cells are cells from which the terminal can receive signals.

It can be understood that the terminal may acquire signal strengths of the serving cell and the neighboring cells at intervals of the predetermined time period within a time period from the beginning of the acquiring to a current moment. For example, if the acquiring starts from the $0^{th}$ second, a current moment is the $6.3^{th}$ second, and the predetermined time period is 2 seconds, the terminal acquires signal strengths of the serving cell and the neighboring cells at the $0^{th}$ second, the $2^{nd}$ second, the $4^{th}$ second, and the $6^{th}$ second.

It should be noted that the predetermined time period may be set according to an actual situation, for example, may be set to 1 second, may be set to 0.5 seconds, or may be set to another value, and no limitation is imposed thereon.

102: The terminal determines a candidate target cell set, where the candidate target cell set includes neighboring cells whose first strength parameters are greater than a first strength parameter of the serving cell at a specific moment.

After acquiring the signal strengths of the serving cell and the signal strengths of the neighboring cells according to the predetermined time period, the terminal may compare a first strength parameter of the serving cell at a specific moment with first strength parameters of the neighboring cells at the specific moment, and use neighboring cells whose first strength parameters are greater than the first strength parameter of the serving cell at the specific moment to form a candidate target cell set, where the specific moment is a latest moment when a signal strength of the serving cell and signal strengths of the neighboring cells are acquired, and the first strength parameter is a signal strength or a strength parameter obtained by calculating according to a signal strength.

It can be understood that the specific moment is not necessarily the same as a moment when step 102 is performed, and the moment when step 102 is performed may be the specific moment or may not be the specific moment, which is not limited herein. For example, if starting from the $0^{th}$ second, signal strengths of the serving cell and signal strengths of the neighboring cells are acquired according to a predetermined time period of 1 second, if a moment when step 102 is performed is the $6.4^{th}$ second, a latest moment when the terminal acquires a signal strength of the serving cell and signal strengths of the neighboring cells is the $6^{th}$ second, and in this case, the moment when step 102 is performed is the $6.4^{th}$ second while the specific moment is the $6^{th}$ second; if a moment when step 102 is performed is the $8^{th}$ second, a latest moment when the terminal acquires a signal strength of the serving cell and signal strengths of the neighboring cells is the $8^{th}$ second, and in this case, the moment when step 102 is performed and the specific moment are the same and are both the 8$^{th}$ second.

103: The terminal detects signal change trends, which are within a predetermined time length before the specific moment, of the neighboring cells in the candidate target cell set.

After obtaining the candidate target cell set, the terminal detects signal change trends, which are within a predetermined time length before the specific moment, of the neighboring cells in the candidate target cell set, where the signal change trend includes a stable trend, an ascending trend, or a descending trend.

It can be understood that because signal change trends of the neighboring cells in the candidate target cell set need to be detected, it is required that the predetermined time length as duration of detection be greater than the predetermined time period and the signal change trends can be detected, that is, signal strengths of the serving cell and signal strengths of the neighboring cells can be detected for at least three times within the predetermined time length. Further, an end point of the predetermined time length may be a moment before the specific time as long as the signal change trends within the predetermined time length can reflect signal change trends at the specific moment to some degree. Certainly, the closer the end point of the predetermined time length is to the specific moment, the better the signal change trends at the specific moment can be reflected. The predetermined time length and the end point of the predetermined time length may be set according to an actual application situation. Preferably, the endpoint of the predetermined time length is the specific moment. For example, if the acquiring starts from the 0$^{th}$ second, a current moment is the 6$^{th}$ second, the predetermined time period is 1 second, and the predetermined time length may be 5 seconds, the terminal detects signal change trends, which are within 5 seconds from the 1$^{st}$ second to the 6$^{th}$ second, of the neighboring cells in the candidate target cell set; and if a current moment is the 8$^{th}$ second, the terminal detects signal change trends, which are within 5 seconds from the 3$^{rd}$ second to the 8$^{th}$ second, of the neighboring cells in the candidate target cell set. The predetermined time length may also be set according to an actual application situation as long as signal change trends of the neighboring cells within the predetermined time length can be determined.

104: The terminal determines that a neighboring cell in a set of neighboring cells whose signal change trends satisfy a first state in the candidate target cell set is a target cell, where the first state is a stable trend and/or an ascending trend.

After detecting the signal change trends, which are within the predetermined time length, of the neighboring cells in the candidate target cell set, the terminal determines that a neighboring cell in a set of neighboring cells whose signal change trends satisfy a first state in the candidate target cell set is a target cell, where the first state is a stable trend and/or an ascending trend.

It can be understood that there are three manners herein:

The first one is that the terminal determines that a neighboring cell in a set of neighboring cells whose signal change trends satisfy the stable trend in the candidate target cell set is the target cell.

The second one is that the terminal determines that a neighboring cell in a set of neighboring cells whose signal change trends satisfy the ascending trend in the candidate target cell set is the target cell.

The third one is that the terminal determines that a neighboring cell in a neighboring cell set, which is formed by neighboring cells whose signal change trends satisfy the stable trend and neighboring cells whose signal change trends satisfy the ascending trend in the candidate target cell set, is the target cell.

A suitable manner may be selected from the three manners according to a need of an actual application, and no limitation is imposed thereon.

105: The terminal reselects the target cell as a serving cell.

After determining the target cell, the terminal reselects the target cell as a serving cell.

In this embodiment of the present invention, a terminal implements reselection of a serving cell by determining signal change trends of neighboring cells. A basis thereof lies in that it is found by analyzing strengths of cell signals captured in a high-speed train that typical camping time of a single cell is 20 s, and before disconnection from a network or reselection occurs, a signal of a serving cell is continuously weak (RSRP/−90 dBm) or suddenly weakens while signal strengths of neighboring cells change regularly. Specifically, a terminal acquires signal strengths of a serving cell and signal strengths of neighboring cells according to a predetermined time period, and selects neighboring cells whose first strength parameters are greater than a first strength parameter of the serving cell at a specific moment to form a candidate target cell set, where the first strength parameter is a signal strength or a strength parameter obtained by calculating according to a signal strength, and the specific moment is a latest moment when a signal strength of the serving cell and signal strengths of the neighboring cells are acquired, and therefore, all the neighboring cells in the candidate target cell set have relatively great signal strengths at the specific moment; and the terminal detects signal change trends, which are within a predetermined time length before the specific moment, of the neighboring cells in the candidate target cell set, and determines that a neighboring cell in a set of neighboring cells whose signal change trends satisfy a first state in the candidate target cell set is a target cell, where the first state is a stable trend and/or an ascending trend, that is, the target cell has a relatively great signal strength and the signal strength may increase continuously, and therefore, the terminal directly reselects the target cell as a serving cell without a need to determine a hysteresis time, so that the terminal can reselect a suitable target cell in time in a case in which signals change quickly, thereby improving signal quality of a network on which the terminal camps, reducing a quantity of times of temporary disconnection from a network, and increasing a call connection rate of the terminal.

Figure 2:
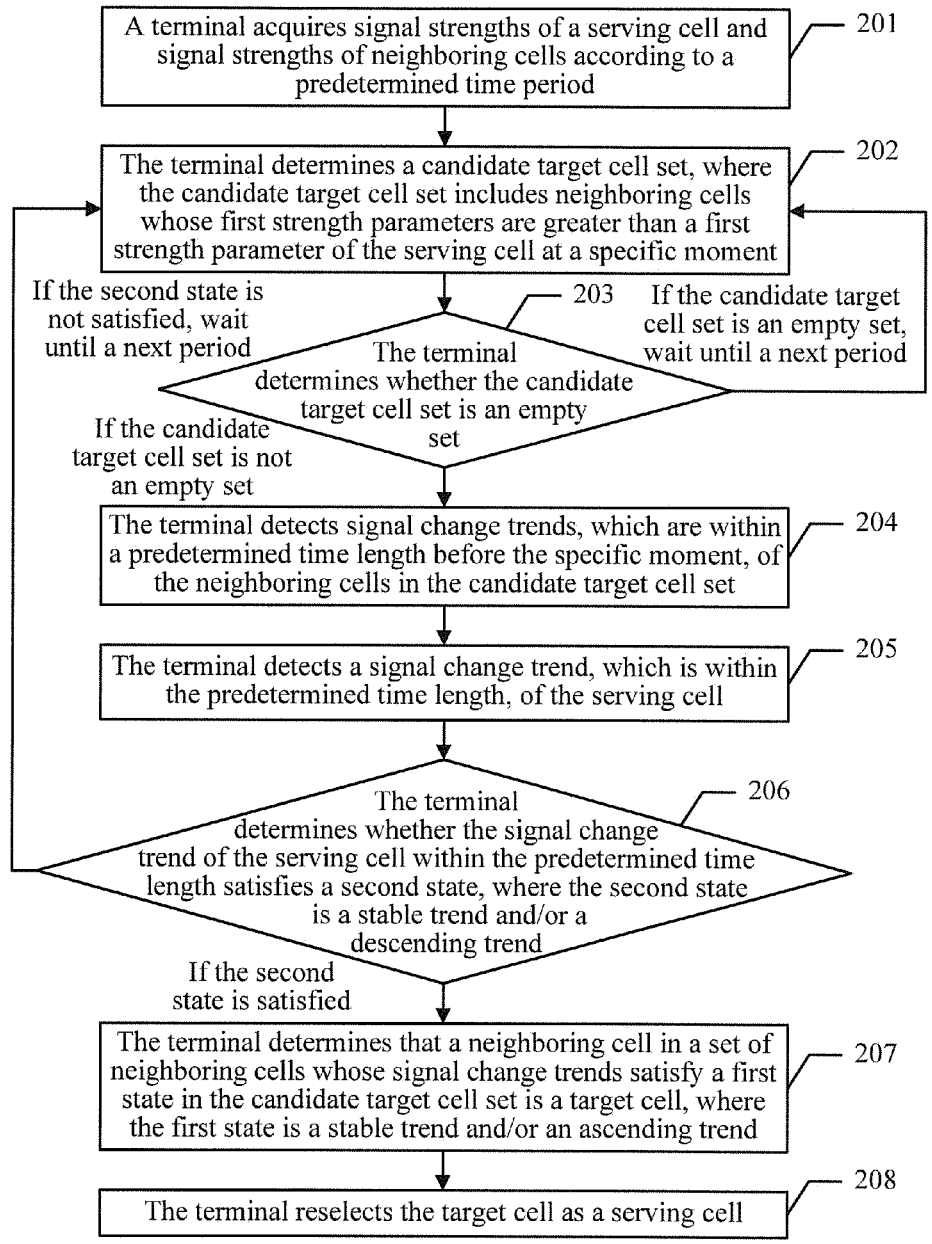
FIG. 2 is another schematic flowchart of a method for selecting a target cell according to an embodiment of the present invention.

In the foregoing embodiment, the terminal determines that a neighboring cell in the set of neighboring cells whose signal change trends satisfy the first state in the candidate target cell set is a target cell, and at this time, a signal change trend of the serving cell may be an ascending trend, may be a stable trend, or may be a descending trend. In an actual application, before it is determined that a neighboring cell in the set of neighboring cells whose signal change trends satisfy the first state in the candidate target cell set is a target cell, a signal change trend of the serving cell may be determined first, and the signal change trend of the serving cell and the signal change trends of the neighboring cells are used together as reference conditions for selecting a target cell. Referring to FIG. 2, another embodiment of a method for selecting a target cell in the embodiments of the present invention includes:

201: A terminal acquires signal strengths of a serving cell and signal strengths of neighboring cells according to a predetermined time period.

When a terminal is in a normal state of camping on a network, the terminal acquires signal strengths of a serving cell and signal strengths of neighboring cells according to a predetermined time period, where the serving cell is a cell on which the terminal currently camps, and the neighboring cells are cells from which the terminal can receive signals.

It can be understood that the terminal may acquire signal strengths of the serving cell and the neighboring cells at intervals of the predetermined time period within a time period from the beginning of the acquiring to a current moment. For example, if the acquiring starts from the $0^{th}$ second, a current moment is the $6.3^{th}$ second, and the predetermined time period is 2 seconds, the terminal acquires signal strengths of the serving cell and the neighboring cells at the $0^{th}$ second, the $2^{nd}$ second, the $4^{th}$ second, and the $6^{th}$ second.

It should be noted that the predetermined time period may be set according to an actual situation, for example, may be set to 1 second, may be set to 0.5 seconds, or may be set to another value, and no limitation is imposed thereon.

202: The terminal determines a candidate target cell set, where the candidate target cell set includes neighboring cells whose first strength parameters are greater than a first strength parameter of the serving cell at a specific moment.

After acquiring the signal strengths of the serving cell and the signal strengths of the neighboring cells according to the predetermined time period, the terminal may compare a first strength parameter of the serving cell at a specific moment with first strength parameters of the neighboring cells at the specific moment, and use neighboring cells whose first strength parameters are greater than the first strength parameter of the serving cell at the specific moment to form a candidate target cell set, where the specific moment is a latest moment when a signal strength of the serving cell and signal strengths of the neighboring cells are acquired, and the first strength parameter is a signal strength or a strength parameter obtained by calculating according to a signal strength.

When the first strength parameter is a strength parameter obtained by calculating according to a signal strength, there may be many specific calculation manners. For example, the first strength parameter may be obtained by subtracting an receive sensitivity RXLEV_ACCESS_MIN of a cell base station from a signal strength Rxlev, or may be obtained by subtracting a product of an receive sensitivity of a cell base station and a preset weight (for example, 40%) from a signal strength, or according to different needs of actual applications, may be obtained by calculating according to a signal strength and another parameter of a cell base station, which is not limited herein.

It can be understood that the specific moment is not necessarily the same as a moment when step 202 is performed, and the moment when step 202 is performed may be the specific moment or may not be the specific moment, which is not limited herein. For example, if starting from the $0^{th}$ second, signal strengths of the serving cell and signal strengths of the neighboring cells are acquired according to a predetermined time period of 1 second, if a moment when step 202 is performed is the $6.4^{th}$ second, a latest moment when the terminal acquires a signal strength of the serving cell and signal strengths of the neighboring cells is the $6^{th}$ second, and in this case, the moment when step 202 is performed is the $6.4^{th}$ second while the specific moment is the $6^{th}$ second; if a moment when step 202 is performed is the $8^{th}$ second, a latest moment when the terminal acquires a signal strength of the serving cell and signal strengths of the neighboring cells is the $8^{th}$ second, and in this case, the moment when step 202 is performed and the specific moment are the same and are both the $8^{th}$ second.

203: The terminal determines whether the candidate target cell set is an empty set.

After obtaining the candidate target cell set, the terminal determines whether the candidate target cell set is an empty set; and when it is determined that the candidate target cell set is not an empty set, step 204 is triggered; or when it is determined that the candidate target cell set is an empty set, indicating that there is no neighboring cell whose signal strength is greater than that of the serving cell at a current moment during a current period, the terminal waits until a next predetermined time period to re-trigger step 202.

It can be understood that in order to save overheads of the terminal, when determining that the candidate target cell set is an empty set, the terminal may not wait for only one predetermined time period to trigger step 202, and may wait for a longer time, for example, two, three or more predetermined time periods, to re-trigger step 202, which may be set according to an actual need and is not limited herein.

204: The terminal detects signal change trends, which are within a predetermined time length before the specific moment, of the neighboring cells in the candidate target cell set.

After obtaining the candidate target cell set and determining that the candidate target cell set is not an empty set, the terminal detects signal change trends, which are within a predetermined time length before the specific moment, of the neighboring cells in the candidate target cell set, where the signal change trend is a trend of changes of a signal strength, and the signal change trend includes a stable trend, an ascending trend, or a descending trend.

It can be understood that because signal change trends of the neighboring cells in the candidate target cell set need to be detected, it is required that the predetermined time length as duration of detection be greater than the predetermined time period and the signal change trends can be detected, that is, signal strengths of the serving cell and signal strengths of the neighboring cells can be detected for at least three times within the predetermined time length. Further, an end point of the predetermined time length may be a moment before the specific time as long as the signal change trends within the predetermined time length can reflect signal change trends at the specific moment to some degree. Certainly, the closer the end point of the predetermined time length is to the specific moment, the better the signal change trends at the specific moment can be reflected. The predetermined time length and the end point of the predetermined time length may be set according to an actual application situation. Preferably, the endpoint of the predetermined time length is the specific moment. For example, if the acquiring starts from the $0^{th}$ second, a current moment is the $6^{th}$ second, the predetermined time period is 1 second, and the predetermined time length may be 5 seconds, the terminal detects signal change trends, which are within 5 seconds from the $1^{st}$ second to the $6^{th}$ second, of the neighboring cells in the candidate target cell set; and if a current moment is the $8^{th}$ second, the terminal detects signal change trends, which are within 5 seconds from the $3^{rd}$ second to the $8^{th}$ second, of the neighboring cells in the candidate target cell set. The predetermined time length may also be set according to an actual application situation as long as signal change trends of the neighboring cells within the predetermined time length can be determined.

205: The terminal detects a signal change trend, which is within the predetermined time length, of the serving cell.

After acquiring signal strengths of the serving cell that are within the predetermined time length, the terminal may detect a signal change trend, which is within the predetermined time length, of the serving cell.

It can be understood that a sequence of performing step 205 and step 204 is not limited. Step 205 may be performed before step 204 or may be performed after step 204; or step 205 and step 204 may be performed simultaneously, which is not limited herein.

206: The terminal determines whether the signal change trend of the serving cell within the predetermined time length satisfies a second state, where the second state is a stable trend and/or a descending trend.

After detecting the signal change trend of the serving cell that is within the predetermined time length, the terminal determines whether the signal change trend of the serving cell within the predetermined time length satisfies a second state.

It can be understood that the second state is a stable trend and/or a descending trend; therefore, there are three manners for determining that the signal change trend of the serving cell satisfies the second state.

The first one is that when it is determined that the signal change trend of the serving cell within the predetermined time length satisfies the stable trend, it is determined that the signal change trend of the serving cell within the predetermined time length satisfies the second state.

The second one is that when it is determined that the signal change trend of the serving cell within the predetermined time length satisfies the descending trend, it is determined that the signal change trend of the serving cell within the predetermined time length satisfies the second state.

The third one is that when it is determined that the signal change trend of the serving cell within the predetermined time length satisfies either the descending trend and the stable trend, it is determined that the signal change trend of the serving cell within the predetermined time length satisfies the second state.

A suitable manner may be selected from the three manners according to a need of an actual application, and no limitation is imposed thereon. Generally, if frequency of cell reselection needs to be reduced, the second manner thereof is preferred; if it needs to be ensured as much as possible that the terminal is not disconnected from a network, the third manner thereof is preferred.

When it is determined that the signal change trend of the serving cell within the predetermined time length satisfies the second state, step 207 is triggered; or when it is determined that the signal change trend of the serving cell within the predetermined time length does not satisfy the second state, indicating that the signal change trend, which is determined at the specific moment, of the serving cell within the predetermined time length does not satisfy a requirement for reselection and a moment for reselecting a serving cell has not come yet, the terminal may wait until a next period to trigger step 202.

207: The terminal determines that a neighboring cell in a set of neighboring cells whose signal change trends satisfy a first state in the candidate target cell set is a target cell, where the first state is a stable trend and/or an ascending trend.

After the signal change trends of the neighboring cells in the candidate target cell set within the predetermined time length are detected, when determining that the signal change trend of the serving cell within the predetermined time length satisfies the second state, the terminal determines that a neighboring cell in a set of neighboring cells whose signal change trends satisfy a first state in the candidate target cell set is a target cell, where the first state is a stable trend and/or an ascending trend.

It can be understood that there are also three manners for determining that the signal change trends of the neighboring cells satisfy the first state.

The first one is that the terminal determines that a neighboring cell in a set of neighboring cells whose signal change trends satisfy the stable trend in the candidate target cell set is the target cell.

The second one is that the terminal determines that a neighboring cell in a set of neighboring cells whose signal change trends satisfy the ascending trend in the candidate target cell set is the target cell.

The third one is that the terminal determines that a neighboring cell in a neighboring cell set, which is formed by neighboring cells whose signal change trends satisfy the stable trend and neighboring cells whose signal change trends satisfy the ascending trend in the candidate target cell set, is the target cell.

A suitable manner may be selected from the three manners according to a need of an actual application, and no limitation is imposed thereon. Generally, in order to ensure that a signal of a target cell is excellent, the second manner is preferred; if in order to ensure as much as possible that the terminal is not disconnected from a network, the third manner thereof is preferred.

It can be understood that there are three manners in which the signal change trend of the serving cell satisfies the second state, there are also three manners in which the signal change trends of the neighboring cells satisfy the first state, and the manners may be combined at will according to an actual need to achieve different effects. For example, if in order to ensure that a signal of a target cell is optimal and reduce frequency of cell reselection, the second manner in which the signal change trend of the serving cell satisfies the second state and the second manner in which the signal change trends of the neighboring cells satisfy the first state may be combined preferably; or according to a specific situation, in order to achieve another effect, another combination of the manners may be performed, which is not limited herein.

208: The terminal reselects the target cell as a serving cell.

After determining the target cell, the terminal reselects the target cell as a serving cell.

It can be understood that after reselecting the target cell as a serving cell, the terminal may wait until a next predetermined time period to trigger step 202 and start a new round of reselection determining, or wait for a longer time to start a new round of reselection determining, and specific duration of waiting may be determined according to an actual need and is not limited herein.

In this embodiment of the present invention, the terminal uses the signal change trend of the serving cell and the signal change trends of the neighboring cells together as reference conditions for selecting a target cell. Only when determining that the signal change trend of the serving cell within the predetermined time length satisfies the second state, does the terminal determine that a neighboring cell in a set of neighboring cells whose signal change trends satisfy the first state in the candidate target cell set is a target cell, so that reselection of a serving cell is not performed when a signal strength of the serving cell increases. In this way, a signal strength of a target cell is ensured, frequency of reselection of a serving cell is reduced, and system resources are saved.

It can be understood that in an actual application, according to a need of an actual situation, it may be that only the signal change trends of the neighboring cells are used as a reference condition, and no matter whether the signal change trend of the serving cell satisfies the ascending trend, subsequent determining for selecting a target cell is performed as long as the signal change trends of the neighboring cells satisfy the second state, which is not limited herein.

Figure 3:
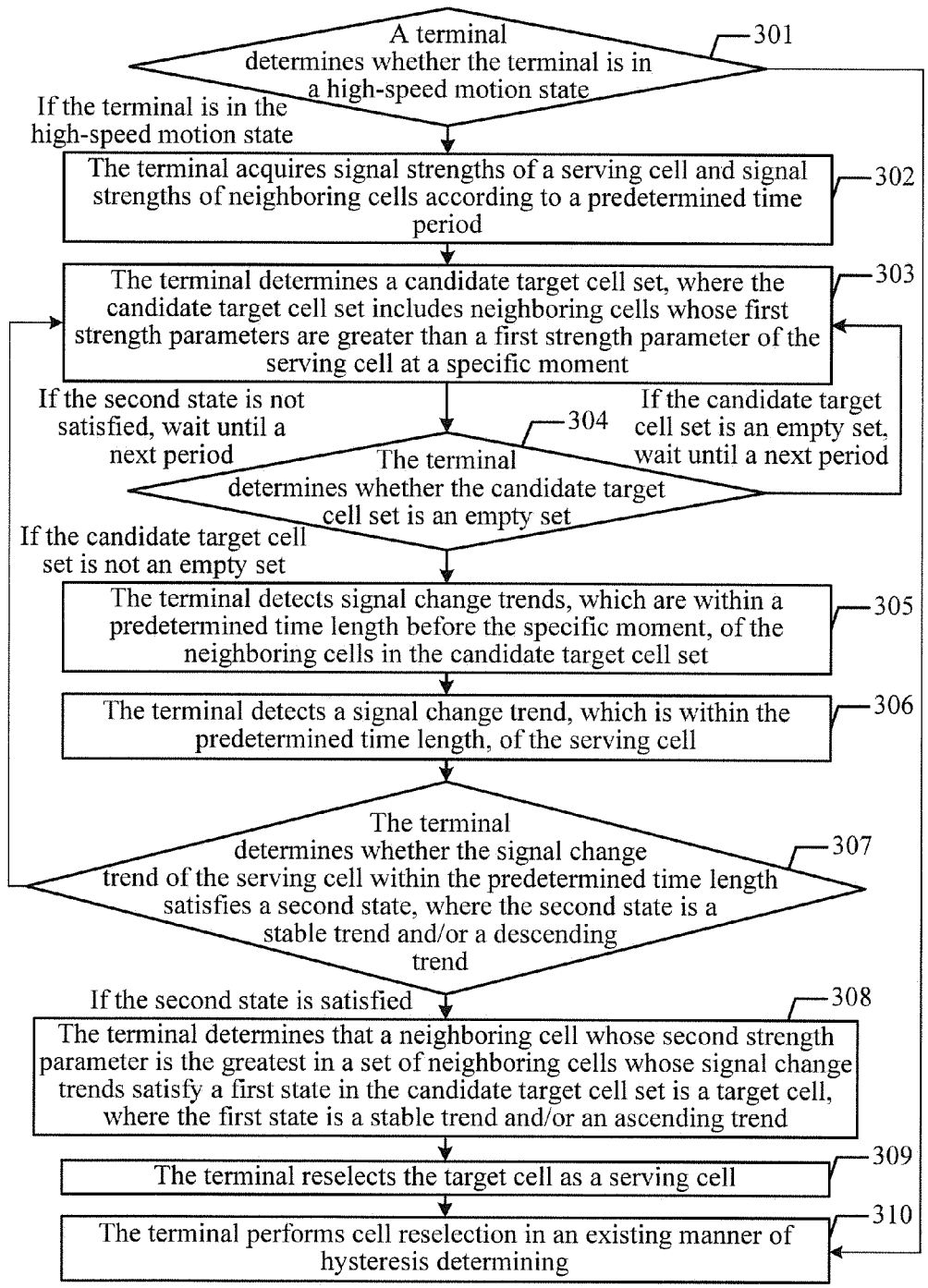
FIG. 3 is another schematic flowchart of a method for selecting a target cell according to an embodiment of the present invention.

In the foregoing embodiment, the terminal performs cell reselection by using the signal change trends of the neighboring cells, and the manner for performing cell reselection may be applied to various scenarios. In an actual application, the terminal may first determine whether the terminal is in a high-speed motion state, and perform cell reselection by using the signal change trends only when the terminal is in the high-speed motion state. In another aspect, in the foregoing embodiment, it is determined that a neighboring cell in the set of neighboring cells whose signal change trends satisfy the first state in the candidate target cell set is a target cell. In an actual application, second strength parameters of neighboring cells in the set of neighboring cells whose signal change trends satisfy the first state may be compared, to determine that a neighboring cell whose second strength parameter is the greatest in the set of neighboring cells whose signal change trends satisfy the first state is the target cell. Referring to FIG. 3, another embodiment of a method for selecting a target cell in the embodiments of the present invention includes:

301: A terminal determines whether the terminal is in a high-speed motion state.

When a terminal is in a normal state of camping on a network, the terminal determines whether the terminal is in a high-speed motion state; and when it is determined that the terminal is in the high-speed motion state, step 302 is triggered; or when it is determined that the terminal is not in the high-speed motion state, step 310 is triggered.

It can be understood that there are multiple manners for determining whether the terminal is in the high-speed motion state.

Optionally, the terminal may detect a speed value of the terminal by using a sensor; and when the speed value of the terminal is greater than a predetermined speed threshold, determine that the terminal is in the high-speed motion state.

Optionally, the terminal may detect whether an offset of automatic frequency control of the terminal within a preset time length is greater than a predetermined offset; and when the offset of the automatic frequency control of the terminal within the preset time length is greater than the predetermined offset, determine that the terminal is in the high-speed motion state.

There may also be many other manners for determining whether the terminal is in the high-speed motion state, and no limitation is imposed thereon.

302: The terminal acquires signal strengths of a serving cell and signal strengths of neighboring cells according to a predetermined time period.

When determining that the terminal is in the high-speed motion state, the terminal acquires signal strengths of a serving cell and signal strengths of neighboring cells according to a predetermined time period, where the serving cell is a cell on which the terminal currently camps, and the neighboring cells are cells from which the terminal can receive signals.

It can be understood that the terminal may acquire signal strengths of the serving cell and the neighboring cells at intervals of the predetermined time period within a time period from the beginning of the acquiring to a current moment. For example, if the acquiring starts from the $0^{th}$ second, a current moment is the $6.3^{th}$ second, and the predetermined time period is 2 seconds, the terminal acquires signal strengths of the serving cell and the neighboring cells at the $0^{th}$ second, the $2^{nd}$ second, the $4^{th}$ second, and the $6^{th}$ second.

It should be noted that the predetermined time period may be set according to an actual situation, for example, may be set to 1 second, may be set to 0.5 seconds, or may be set to another value, and no limitation is imposed thereon.

In this embodiment, preferably, the predetermined time period is 0.47 seconds.

303: The terminal determines a candidate target cell set, where the candidate target cell set includes neighboring cells whose first strength parameters are greater than a first strength parameter of the serving cell at a specific moment.

After acquiring the signal strengths of the serving cell and the signal strengths of the neighboring cells according to the predetermined time period, the terminal may compare a first strength parameter of the serving cell at a specific moment with first strength parameters of the neighboring cells at the specific moment, and use neighboring cells whose first strength parameters are greater than the first strength parameter of the serving cell at the specific moment to form a candidate target cell set, where the specific moment is a latest moment when a signal strength of the serving cell and signal strengths of the neighboring cells are acquired, and the first strength parameter is a signal strength or a strength parameter obtained by calculating according to a signal strength.

When the first strength parameter is a strength parameter obtained by calculating according to a signal strength, there may be many specific calculation manners. For example, the first strength parameter may be obtained by subtracting an receive sensitivity RXLEV_ACCESS_MIN of a cell base station from a signal strength Rxlev, or may be obtained by subtracting a product of an receive sensitivity of a cell base station and a preset weight (for example, 40%) from a signal strength, or according to different needs of actual applications, may be obtained by calculating according to a signal strength and another parameter of a cell base station, which is not limited herein.

In this embodiment, preferably, the first strength parameter is a signal strength Rxlev minus an receive sensitivity RXLEV_ACCESS_MIN of a cell base station.

It can be understood that the specific moment is not necessarily the same as a moment when step 303 is performed, and the moment when step 303 is performed may be the specific moment or may not be the specific moment, which is not limited herein. For example, if starting from the $0^{th}$ second, signal strengths of the serving cell and signal strengths of the neighboring cells are acquired according to a predetermined time period of 1 second, if a moment when step 303 is performed is the $6.4^{th}$ second, a latest moment when the terminal acquires a signal strength of the serving cell and signal strengths of the neighboring cells is the $6^{th}$ second, and in this case, the moment when step 303 is performed is the $6.4^{th}$ second while the specific moment is the $6^{th}$ second; if a moment when step 303 is performed is the $8^{th}$ second, a latest moment when the terminal acquires a signal strength of the serving cell and signal strengths of the neighboring cells is the $8^{th}$ second, and in this case, the moment when step 303 is performed and the specific moment are the same and are both the $8^{th}$ second.

304: The terminal determines whether the candidate target cell set is an empty set.

After obtaining the candidate target cell set, the terminal determines whether the candidate target cell set is an empty set; and when it is determined that the candidate target cell set is not an empty set, step 305 is triggered; or when it is determined that the candidate target cell set is an empty set, indicating that there is no neighboring cell whose signal strength is greater than that of the serving cell at a current moment during a current period, the terminal waits until a next predetermined time period to re-trigger step 303.

It can be understood that in order to save overheads of the terminal, when determining that the candidate target cell set is an empty set, the terminal may not wait for only one predetermined time period to trigger step 303, and may wait for a longer time, for example, two, three or more predetermined time periods, to re-trigger step 303, which may be set according to an actual need and is not limited herein.

305: The terminal detects signal change trends, which are within a predetermined time length before the specific moment, of the neighboring cells in the candidate target cell set.

After obtaining the candidate target cell set and determining that the candidate target cell set is not an empty set, the terminal detects signal change trends, which are within a predetermined time length before the specific moment, of the neighboring cells in the candidate target cell set, where the signal change trend is a trend of changes of a signal strength, and the signal change trend includes a stable trend, an ascending trend, or a descending trend.

It can be understood that because signal change trends of the neighboring cells in the candidate target cell set need to be detected, it is required that the predetermined time length as duration of detection be greater than the predetermined time period and the signal change trends can be detected, that is, signal strengths of the serving cell and signal strengths of the neighboring cells can be detected for at least three times within the predetermined time length. Further, an end point of the predetermined time length may be a moment before the specific time as long as the signal change trends within the predetermined time length can reflect signal change trends at the specific moment to some degree. Certainly, the closer the end point of the predetermined time length is to the specific moment, the better the signal change trends at the specific moment can be reflected. The predetermined time length and the end point of the predetermined time length may be set according to an actual application situation. Preferably, the end point of the predetermined time length is the specific moment. For example, if the acquiring starts from the $0^{th}$ second, a current moment is the $6^{th}$ second, the predetermined time period is 1 second, and the predetermined time length may be 5 seconds, the terminal detects signal change trends, which are within 5 seconds from the $1^{st}$ second to the $6^{th}$ second, of the neighboring cells in the candidate target cell set; and if a current moment is the $8^{th}$ second, the terminal detects signal change trends, which are within 5 seconds from the $3^{rd}$ second to the $8^{th}$ second, of the neighboring cells in the candidate target cell set. The predetermined time length may also be set according to an actual application situation as long as signal change trends of the neighboring cells within the predetermined time length can be determined.

In this embodiment, preferably, the predetermined time length is 5 seconds.

306: The terminal detects a signal change trend, which is within the predetermined time length, of the serving cell.

After acquiring signal strengths of the serving cell that are within the predetermined time length, the terminal may detect a signal change trend, which is within the predetermined time length, of the serving cell.

It can be understood that a sequence of performing step 306 and step 305 is not limited. Step 306 may be performed before step 305 or may be performed after step 305; or step 306 and step 305 may be performed simultaneously, which is not limited herein.

307: The terminal determines whether the signal change trend of the serving cell within the predetermined time length satisfies a second state, where the second state is a stable trend and/or a descending trend.

After detecting the signal change trend of the serving cell that is within the predetermined time length, the terminal determines whether the signal change trend of the serving cell within the predetermined time length satisfies a second state.

It can be understood that the second state is a stable trend and/or a descending trend; therefore, there are three manners for determining that the signal change trend of the serving cell satisfies the second state.

The first one is that when it is determined that the signal change trend of the serving cell within the predetermined time length satisfies the stable trend, it is determined that the signal change trend of the serving cell within the predetermined time length satisfies the second state.

Optionally, this manner may be further limited: when it is determined that the signal change trend of the serving cell within the predetermined time length satisfies the stable trend and is less than a first signal strength threshold, it is determined that the signal change trend of the serving cell within the predetermined time length satisfies the second state.

The second one is that when it is determined that the signal change trend of the serving cell within the predetermined time length satisfies the descending trend, it is determined that the signal change trend of the serving cell within the predetermined time length satisfies the second state.

The third one is that when it is determined that the signal change trend of the serving cell within the predetermined time length satisfies either the descending trend and the stable trend, it is determined that the signal change trend of the serving cell within the predetermined time length satisfies the second state.

A suitable manner may be selected from the three manners according to a need of an actual application, and no limitation is imposed thereon. Generally, if frequency of cell reselection needs to be reduced, the second manner thereof is preferred; if it needs to be ensured as much as possible that the terminal is not disconnected from a network, the third manner thereof is preferred.

When it is determined that the signal change trend of the serving cell within the predetermined time length satisfies the second state, step 308 is triggered; or when it is determined that the signal change trend of the serving cell within the predetermined time length does not satisfy the second state, indicating that the signal change trend, which is determined at the specific moment, of the serving cell within the predetermined time length does not satisfy a requirement for reselection and a moment for reselecting a serving cell has not come yet, the terminal may wait until a next period to trigger step 303.

308: The terminal determines that a neighboring cell whose second strength parameter is the greatest in a set of neighboring cells whose signal change trends satisfy a first state in the candidate target cell set is a target cell, where the first state is a stable trend and/or an ascending trend.

After the signal change trends of the neighboring cells in the candidate target cell set within the predetermined time length are detected, when determining that the signal change trend of the serving cell within the predetermined time length satisfies the second state, the terminal determines that a neighboring cell whose second strength parameter is the greatest in a set of neighboring cells whose signal change trends satisfy a first state in the candidate target cell set is a target cell, where the first state is a stable trend and/or an ascending trend.

It can be understood that there are also three manners for determining that the signal change trends of the neighboring cells satisfy the first state.

The first one is that when it is determined that a signal change trend of a neighboring cell in the candidate target cell set satisfies the stable trend, it is determined that the signal change trend of the neighboring cell satisfies the first state.

Optionally, this manner may be further limited: when it is determined that a signal change trend of a neighboring cell in the candidate target cell set satisfies the stable trend and is greater than a second signal strength threshold, it is determined that the signal change trend of the neighboring cell satisfies the first state.

The second one is that when it is determined that a signal change trend of a neighboring cell in the candidate target cell set satisfies the ascending trend, it is determined that the signal change trend of the neighboring cell satisfies the first state.

The third one is that when it is determined that a signal change trend of a neighboring cell in the candidate target cell set satisfies the ascending trend or satisfies the stable trend, it is determined that the signal change trend of the neighboring cell satisfies the first state.

A suitable manner may be selected from the three manners according to a need of an actual application, and no limitation is imposed thereon. Generally, in order to ensure that a signal of a target cell is excellent, the second manner is preferred; if in order to ensure as much as possible that the terminal is not disconnected from a network, the third manner thereof is preferred.

It can be understood that there are three manners in which the signal change trend of the serving cell satisfies the second state, there are also three manners in which the signal change trends of the neighboring cells satisfy the first state, and the manners may be combined at will according to an actual need to achieve different effects. For example, if in order to ensure that a signal of a target cell is optimal and reduce frequency of cell reselection, the second manner in which the signal change trend of the serving cell satisfies the second state and the second manner in which the signal change trends of the neighboring cells satisfy the first state may be combined preferably; or according to a specific situation, in order to achieve another effect, another combination of the manners may be performed, which is not limited herein.

When the second strength parameter is a strength parameter obtained by calculating according to a signal strength, there may be many specific calculation manners. For example, the second strength parameter may be obtained by subtracting an receive sensitivity RXLEV_ACCESS_MIN of a cell base station from a signal strength Rxlev, or may be obtained by subtracting a product of an receive sensitivity of a cell base station and a preset weight (for example, 50%) from a signal strength, or according to different needs of actual applications, may be obtained by calculating according to a signal strength and another parameter of a cell base station, which is not limited herein.

In this embodiment, preferably, the second strength parameter is a signal strength.

In an actual application, the determining, by the terminal, that a neighboring cell whose second strength parameter is the greatest in a set of neighboring cells whose signal change trends satisfy a first state in the candidate target cell set is a target cell may be performed in two stages.

The first stage: The terminal selects a neighboring cell whose second strength parameter is the greatest from the candidate target cell set as a first neighboring cell.

The second stage: The terminal determines whether a signal change trend of the first neighboring cell satisfies the first state.

When it is determined that the signal change trend of the first neighboring cell does not satisfy the first state, the first neighboring cell is removed from the candidate target cell set to update the candidate target cell set, and the first stage is re-performed;

when it is determined that the first neighboring cell satisfies the first state, it is determined that the first neighboring cell is the target cell; or when none of the neighboring cells in the candidate target cell set satisfies the first state and the neighboring cells are removed, the candidate target cell becomes an empty set, and the terminal may wait until a next period to re-trigger step 303.

It can be understood that in an actual application process, besides step 308 in which it is determined that the neighboring cell whose second strength parameter is the greatest in the set of neighboring cells whose signal change trends satisfy the first state in the candidate target cell set is the target cell, a neighboring cell in the set of neighboring cells whose signal change trends satisfy the first state in the candidate target cell set may also be selected as the target cell according to another setting rule. For example, if in order to increase network camping duration of a cell and reduce frequency of cell reselection, it may be determined that a neighboring cell whose second strength parameter is the smallest in the set of neighboring cells whose signal change trends satisfy the first state in the candidate target cell set is the target cell. There may also be another selection manner according to a different actual need, which is not limited herein.

309: The terminal reselects the target cell as a serving cell.

After determining the target cell, the terminal reselects the target cell as a serving cell.

310: The terminal performs cell reselection in an existing manner of hysteresis determining.

When determining that the terminal is not in the high-speed motion state, the terminal performs cell reselection in an existing manner of hysteresis determining.

The performing cell reselection in the existing manner of hysteresis determining includes: controlling a cell reselection behavior of the terminal by using two parameters: a hysteresis signal strength (which is usually 3 dBmV dBm) and a hysteresis time (which is usually set to 5 s). When a strength (for example, −72 dBm) of a signal received from a target cell is greater than a signal strength (−80 dBm) of a serving cell plus the hysteresis signal strength (3 dBm) and duration is greater than the hysteresis time (for example, 5 s), cell reselection is started; otherwise, the terminal continues to camp on the current serving cell.

In this embodiment of the present invention, it is first determined whether the terminal is in a high-speed motion state; and only when the terminal is in the high-speed motion state, is cell reselection performed in a manner of trend determining; otherwise, cell reselection is performed in an existing manner of hysteresis determining. In this way, frequency of cell reselection is obviously reduced in a case of a non-high-speed motion state, and a phenomenon of temporary disconnection from a network can be avoided in a case of a high-speed motion state, which improves applicability of the terminal so that the terminal can better achieve balance between communication quality and system overheads in various application scenarios. Further, the terminal determines that a neighboring cell whose second strength parameter is the greatest in a set of neighboring cells whose signal change trends satisfy a first state in a candidate target cell set is a target cell, so that a signal of the target cell is the best on condition that a required signal change trend is satisfied, thereby improving communication quality of the terminal.

For ease of understanding, the following specifically describes the method for selecting a target cell in the embodiments of the present invention in a specific application scenario.

A sensor in a terminal detects that a current speed value of the terminal is 250 KM/h, which is greater than a predetermined speed threshold 200 KM/h, and the terminal determines that a high-speed motion state is currently available;

the terminal acquires signal strengths of a serving cell A and neighboring cells according to a predetermined time period of 1 second; and assuming that the acquiring starts from the $0^{th}$ second and a current time is the $8.2^{th}$ second, the terminal has already acquired signal strengths that are at the $0^{th}$, $1^{st}$, $2^{nd}$, $3^{rd}$, $4^{th}$, $5^{th}$, $6^{th}$, $7^{th}$, and $8^{th}$ seconds and that are of the serving cell A and the neighboring cells;

the terminal selects four neighboring cells D, E, F, and G whose signal strengths at the $8^{th}$ second (a specific moment) are greater than a signal strength of the serving cell to form a candidate target cell set, where at the $8^{th}$ second, the signal strength of the serving cell A is −80 dBm, a signal strength of the neighboring cell D is −60 dBm, a signal strength of the neighboring cell E is −63 dBm, a signal strength of the neighboring cell F is −50 dBm, and a signal strength of the neighboring cell G is −62 dBm;

the terminal detects a signal change trend of the serving cell that is from the $3^{rd}$ second to the $8^{th}$ second (within a predetermined time length of 5 seconds); learns that a signal strength of the serving cell A at the $3^{rd}$ second is −45 dBm, a signal strength of the serving cell A at the $4^{th}$ second is −47 dBm, a signal strength of the serving cell A at the $5^{th}$ second is −50 dBm, a signal strength of the serving cell A at the $6^{th}$ second is −60 dBm, a signal strength of the serving cell A at the $7^{th}$ second is −70 dBm, and a signal strength of the serving cell A at the $8^{th}$ second is −80 dBm; and determines that the signal change trend of the serving cell from the $3^{rd}$ second to the $8^{th}$ second is a descending trend;

the terminal detects signal change trends that are from the $3^{rd}$ second to the $8^{th}$ second and that are of the neighboring cells in the candidate target cell set, and learns that from the $3^{rd}$ second to the $8^{th}$ second, a signal change trend of the neighboring cell D is an ascending trend, a signal change trend of the neighboring cell E is an ascending trend, a signal change trend of the neighboring cell F is a stable trend, and a signal change trend of the neighboring cell G is a descending trend;

when the terminal determines that the signal change trend of the serving cell from the $3^{rd}$ second to the $8^{th}$ second satisfies the descending trend, the terminal determines that a neighboring cell (the neighboring cell D) whose signal strength is the greatest in a set of neighboring cells (the neighboring cell D and the neighboring cell E) whose signal change trends satisfy the ascending trend in the candidate target cell set is a target cell; and the terminal reselects the target cell (the neighboring cell D) as a serving cell.

Figure 4:
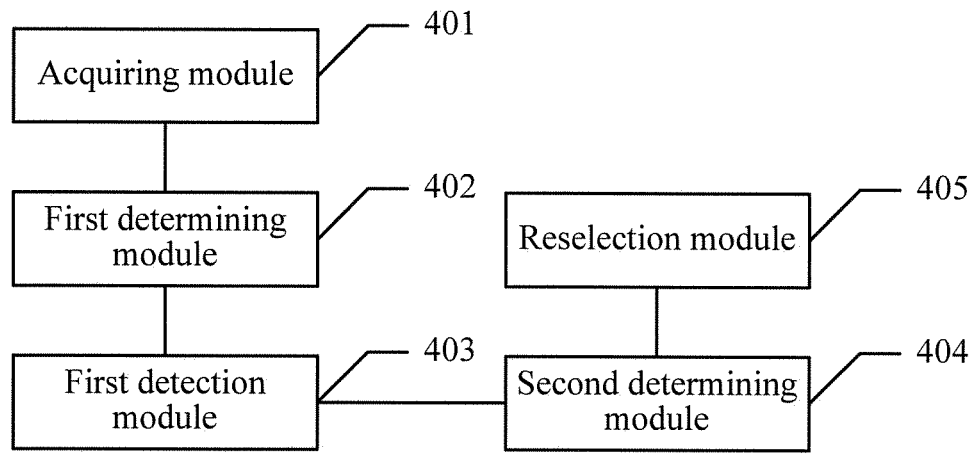
FIG. 4 is a schematic structural diagram of a terminal according to an embodiment of the present invention.

The following describes the terminal in the embodiments of the present invention. Referring to FIG. 4, an embodiment of the terminal in the embodiments of the present invention includes:

an acquiring module 401, configured to acquire signal strengths of a serving cell and signal strengths of neighboring cells according to a predetermined time period, where the serving cell is a cell on which the terminal currently camps, and the neighboring cells are cells from which the terminal can receive signals;

a first determining module 402, configured to determine a candidate target cell set, where the candidate target cell set includes neighboring cells whose first strength parameters are greater than a first strength parameter of the serving cell at a specific moment, where the specific moment is a latest moment when a signal strength of the serving cell and signal strengths of the neighboring cells are acquired, and the first strength parameter is a signal strength or a strength parameter obtained by calculating according to a signal strength;

a first detection module 403, configured to detect signal change trends, which are within a predetermined time length before the specific moment, of the neighboring cells in the candidate target cell set determined by the first determining module 402;

a second determining module 404, configured to determine that a neighboring cell in a set of neighboring cells whose signal change trends, which are detected by the first detection module 403, satisfy a first state in the candidate target cell set is a target cell, where the first state is a stable trend and/or an ascending trend; and a reselection module 405, configured to reselect the target cell, which is determined by the second determining module 404, as a serving cell.

The terminal in this embodiment of the present invention implements reselection of a serving cell by determining signal change trends of neighboring cells. Specifically, an acquiring module 401 acquires signal strengths of a serving cell and signal strengths of neighboring cells according to a predetermined time period; a first determining module 402 selects neighboring cells whose first strength parameters are greater than a first strength parameter of the serving cell at a specific moment to form a candidate target cell set, where the first strength parameter is a signal strength or a strength parameter obtained by calculating according to a signal strength, and the specific moment is a latest moment when a signal strength of the serving cell and signal strengths of the neighboring cells are acquired, and therefore, all the neighboring cells in the candidate target cell set have relatively great signal strengths at the specific moment; a first detection module 403 detects signal change trends, which are within a predetermined time length before the specific moment, of the neighboring cells in the candidate target cell set; a second determining module 404 determines that a neighboring cell in a set of neighboring cells whose signal change trends satisfy a first state in the candidate target cell set is a target cell, where the first state is a stable trend and/or an ascending trend, that is, the target cell has a relatively great signal strength and the signal strength may increase continuously; and therefore, a reselection module 405 directly reselects the target cell as a serving cell without a need to determine a hysteresis time, so that the terminal can reselect a suitable target cell in time in a case in which signals change quickly, thereby improving signal quality of a network on which the terminal camps, reducing a quantity of times of temporary disconnection from a network, and increasing a call connection rate of the terminal.

Figure 5:
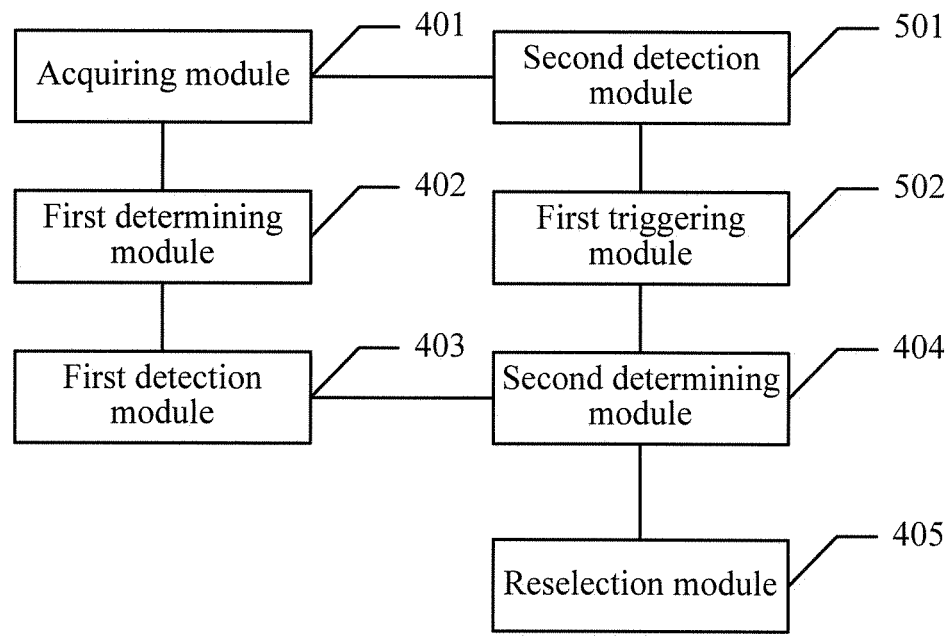
FIG. 5 is another schematic structural diagram of a terminal according to an embodiment of the present invention.

In the foregoing embodiment, the second determining module 404 determines that a neighboring cell in the set of neighboring cells whose signal change trends satisfy the first state in the candidate target cell set is a target cell, and at this time, a signal change trend of the serving cell may be an ascending trend, may be a stable trend, or may be a descending trend. In an actual application, before the second determining module 404 determines that a neighboring cell in the set of neighboring cells whose signal change trends satisfy the first state in the candidate target cell set is a target cell, the terminal may further determine a signal change trend of the serving cell, and use the signal change trend of the serving cell and the signal change trends of the neighboring cells together as reference conditions for selecting a target cell. Referring to FIG. 5, the foregoing terminal further includes:

a second detection module 501, configured to detect a signal change trend, which is within the predetermined time length, of the serving cell; and a first triggering module 502, configured to: when it is determined that the signal change trend of the serving cell within the predetermined time length satisfies a second state, trigger the second determining module 404, where the second state is a stable trend and/or a descending trend.

In the foregoing embodiment, the signal change trend of the serving cell and the signal change trends of the neighboring cells are used together as reference conditions for selecting a target cell. Only when it is determined that the signal change trend of the serving cell within the predetermined time length satisfies the second state, does the first triggering module 502 trigger the second determining module 404 to determine that a neighboring cell in a set of neighboring cells whose signal change trends satisfy the first state in the candidate target cell set is a target cell, so that reselection of a serving cell is not performed when a signal strength of the serving cell increases. In this way, a signal strength of a target cell is ensured, frequency of reselection of a serving cell is reduced, and system resources are saved.

In an actual application, when the second detection module 501 detects that the signal change trend of the serving cell within the predetermined time length does not satisfy the second state, the terminal may wait for a set time length to re-trigger the first determining module 402.

Figure 6:
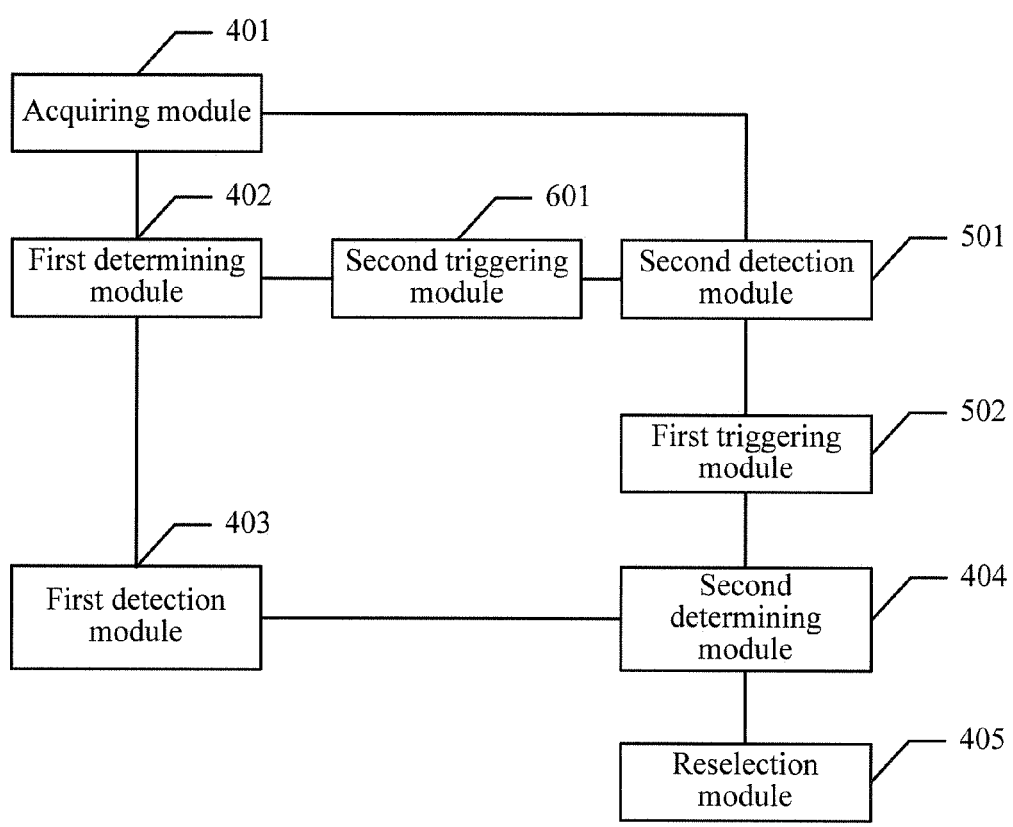
FIG. 6 is another schematic structural diagram of a terminal according to an embodiment of the present invention.

Optionally, as shown in FIG. 6, as another embodiment of a terminal in the present invention, the terminal in the foregoing embodiment corresponding to FIG. 5 may further include:

a second triggering module 601, configured to: when it is determined that the signal change trend of the serving cell within the predetermined time length does not satisfy the second state, wait until a next predetermined time period to trigger the first determining module 402.

In the foregoing embodiment, the first triggering module 601 waits until a next predetermined time period to trigger the first determining module 402, thereby ensuring continuity of cell reselection when a condition is not satisfied.

Figure 7:
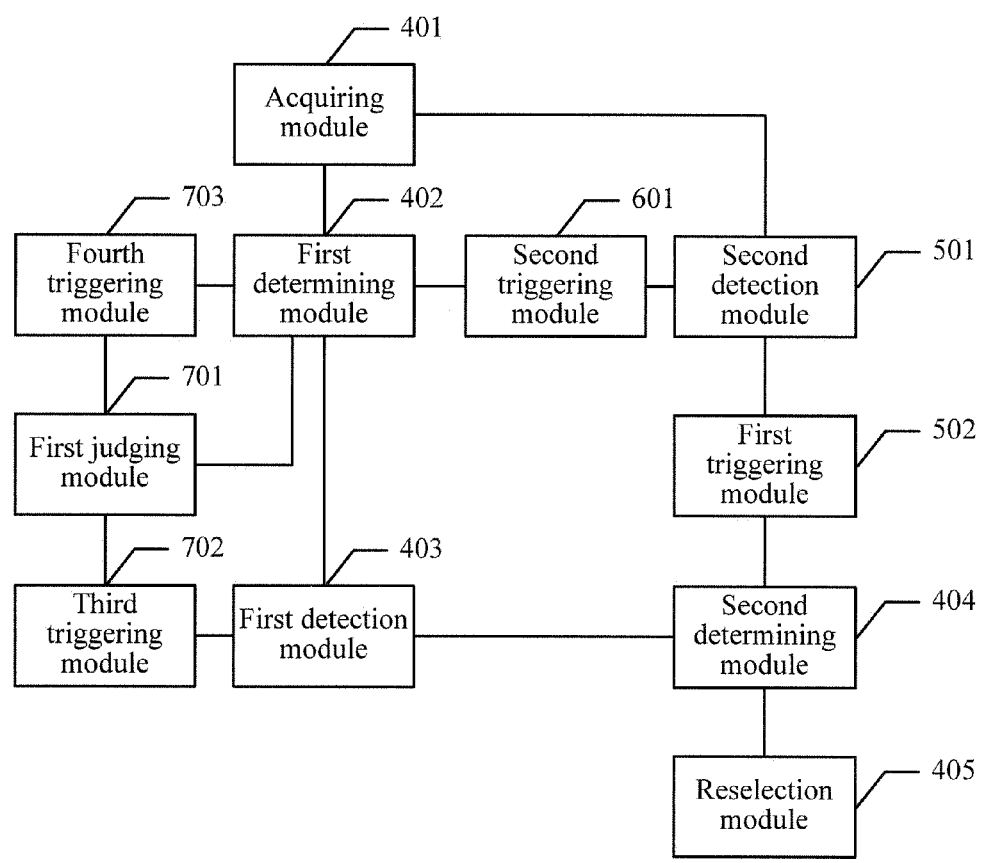
FIG. 7 is another schematic structural diagram of a terminal according to an embodiment of the present invention.

In an actual application, the determined candidate target cell set may be an empty set. In this case, there may be multiple processing manners, and the following uses one of the manners as an example. As shown in FIG. 7, as another embodiment of a terminal of the present invention, the foregoing terminal may further include:

a first judging module 701, configured to determine whether the candidate target cell set is an empty set;

a third triggering module 702, configured to: when it is determined that the candidate target cell set is not an empty set, trigger the first detection module 403; and a fourth triggering module 703, configured to: when it is determined that the candidate target cell set is an empty set, wait until a next predetermined time period to trigger the first determining module 402.

In the foregoing embodiment, when the third triggering module 702 triggers the first detection module 403 only when it is determined that the candidate target cell set is not an empty set; otherwise, the fourth triggering module waits until a next predetermined time period to trigger the first determining module 402, thereby ensuring continuity of a cell reselection process when the candidate target cell set is an empty set.

In the foregoing embodiment, the second determining module 404 determines that a neighboring cell in the set of neighboring cells whose signal change trends satisfy the first state in the candidate target cell set is a target cell. In an actual application, the second determining module 404 may compare second strength parameters of the neighboring cells in the set of neighboring cells whose signal change trends satisfy the first state, to determine that a neighboring cell whose second strength parameter is the greatest in the set of neighboring cells whose signal change trends satisfy the first state is the target cell. Therefore, the second determining module 404 in the foregoing terminal may be specifically configured to determine that a neighboring cell whose second strength parameter is the greatest in the set of neighboring cells whose signal change trends satisfy the first state in the candidate target cell set is the target cell, where the second strength parameter is a signal strength or a strength parameter obtained by calculating according to a signal strength.

It can be understood that in an actual application process, besides determining that the neighboring cell whose second strength parameter is the greatest in the set of neighboring cells whose signal change trends satisfy the first state in the candidate target cell set is the target cell, the second determining module 404 may also select, according to another setting rule, a neighboring cell in the set of neighboring cells whose signal change trends satisfy the first state in the candidate target cell set as the target cell. For example, if in order to increase network camping duration of a cell and reduce frequency of cell reselection, the second determining module 404 may determine that a neighboring cell whose second strength parameter is the smallest in the set of neighboring cells whose signal change trends satisfy the first state in the candidate target cell set is the target cell. There may also be another selection manner according to a different actual need, which is not limited herein.

Figure 8:
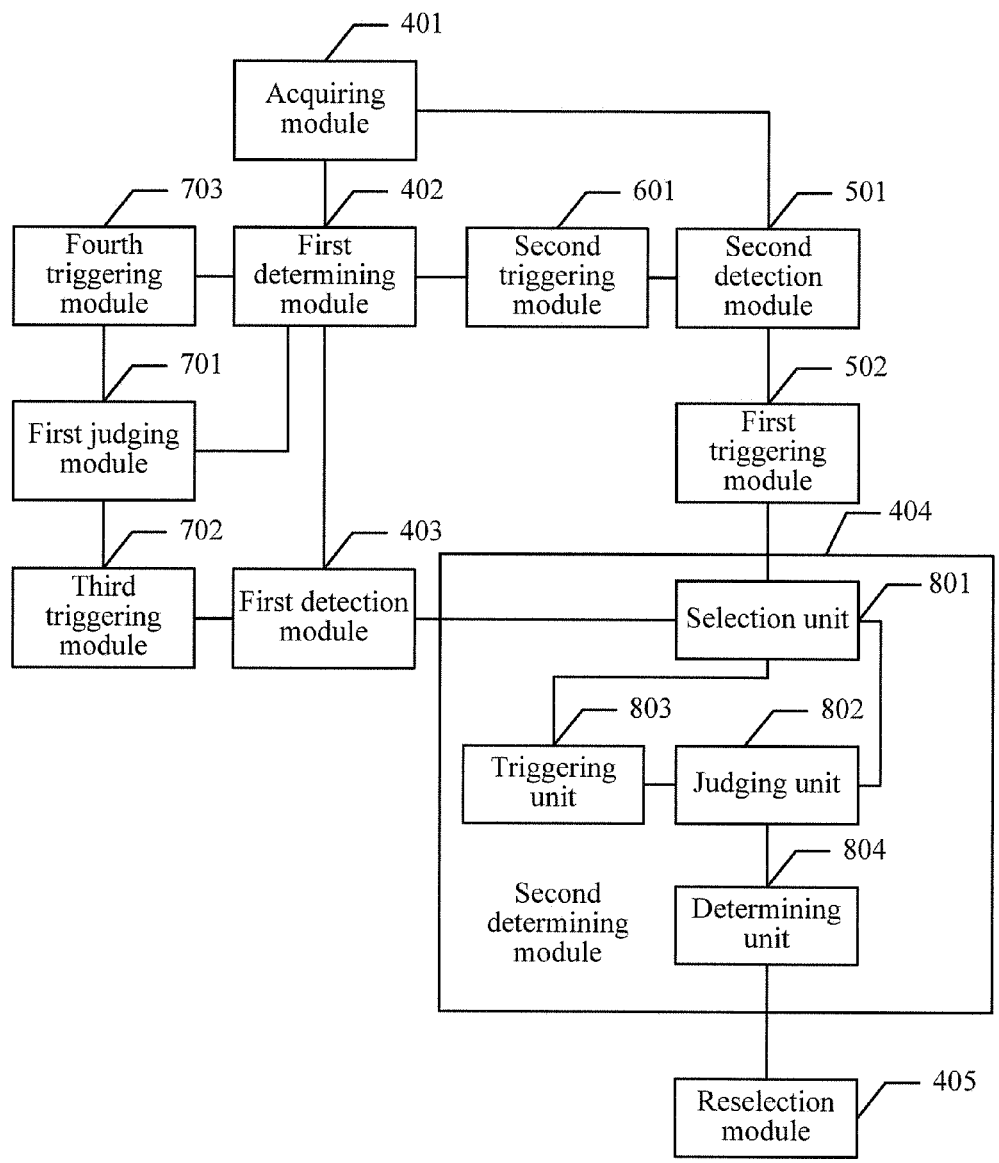
FIG. 8 is another schematic structural diagram of a terminal according to an embodiment of the present invention.

In the foregoing embodiment, the second determining module 404 determines that the neighboring cell whose second strength parameter is the greatest in the set of neighboring cells whose signal change trends satisfy the first state in the candidate target cell set is the target cell. In an actual application, the determining may be performed by multiple units in the second determining module 404 in stages. Referring to FIG. 8, as another embodiment of a terminal in the embodiments of the present invention, in the terminal in the embodiment corresponding to FIG. 7, the second determining module 404 specifically includes:

a selection unit 801, configured to select a neighboring cell whose signal strength is the greatest from the candidate target cell set as a first neighboring cell;

a judging unit 802, configured to determine whether a signal change trend of the first neighboring cell satisfies the first state;

a triggering unit 803, configured to: when it is determined that the signal change trend of the first neighboring cell does not satisfy the first state, remove the first neighboring cell from the candidate target cell set to update the candidate target cell set, and re-trigger the selection unit 801; and a determining unit 804, configured to: when it is determined that the first neighboring cell satisfies the first state, determine that the first neighboring cell is the target cell.

In the foregoing embodiment, when none of the neighboring cells in the candidate target cell set satisfies the first state and the neighboring cells are removed by the triggering unit 803, the candidate target cell becomes an empty set, and the terminal may wait until a next period to re-trigger the first determining module 402.

Figure 9:
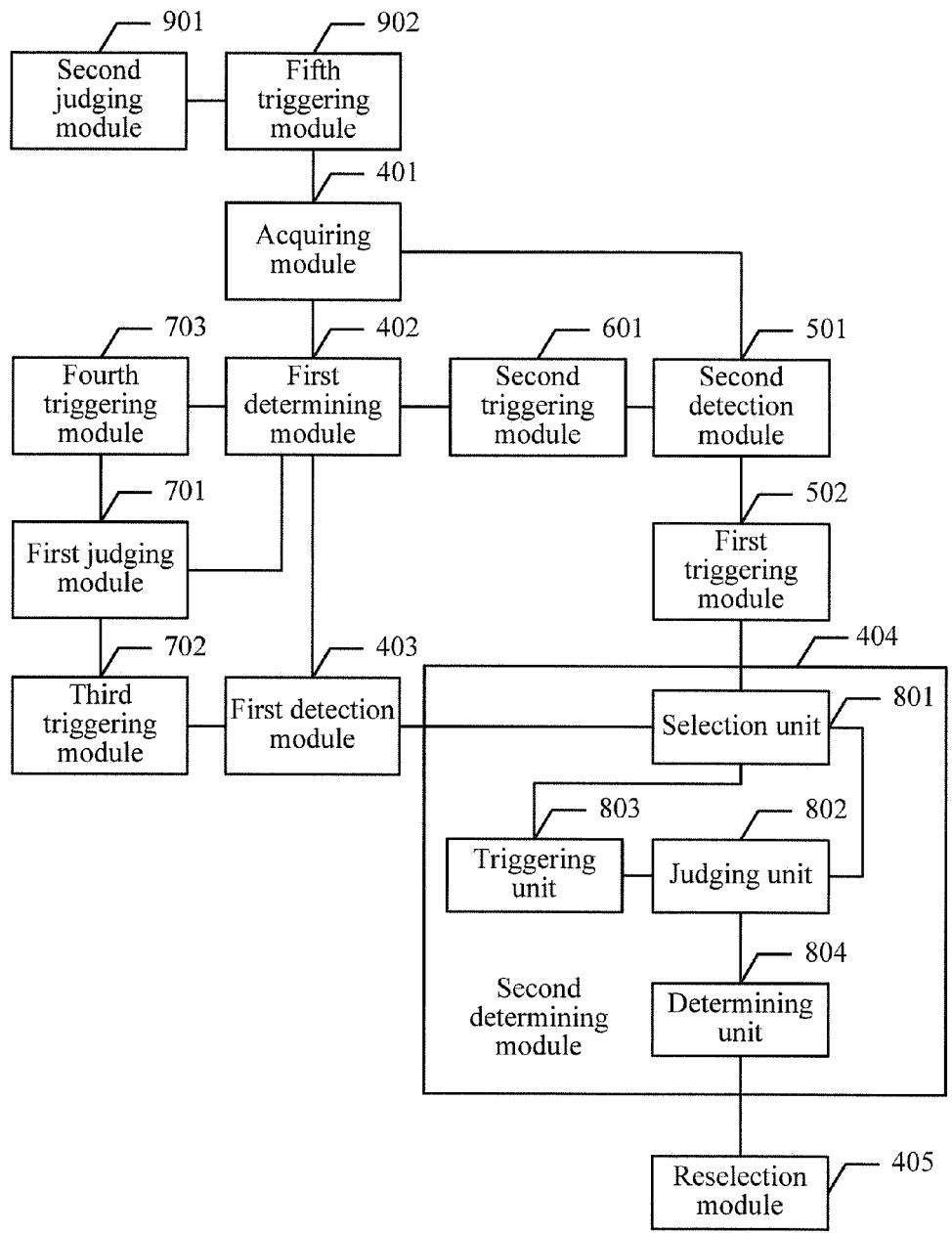
FIG. 9 is another schematic structural diagram of a terminal according to an embodiment of the present invention.

In the foregoing embodiment, the terminal performs cell reselection by using the signal change trends of the neighboring cells, and the manner for performing cell reselection may be applied to various scenarios. In an actual application, the terminal may first determine whether the terminal is in a high-speed motion state, and perform cell reselection by using the signal change trends only when the terminal is in the high-speed motion state. Referring to FIG. 9, as another embodiment of a terminal in the embodiments of the present invention, the foregoing terminal further includes:

a second judging module 901, configured to determine whether the terminal is in a high-speed motion state; and a fifth triggering module 902, configured to: when it is determined that the terminal is in the high-speed motion state, trigger the acquiring module 401.

In this embodiment of the present invention, the second judging module 901 first determines whether the terminal is in a high-speed motion state; and only when the terminal is in the high-speed motion state, does the fifth triggering module 902 trigger the acquiring module 401, to start cell reselection in a manner of trend determining; otherwise, cell reselection is performed in an existing manner of hysteresis determining. In this way, frequency of cell reselection is obviously reduced in a case of a non-high-speed motion state, and a phenomenon of temporary disconnection from a network can be avoided in a case of a high-speed motion state, which improves applicability of the terminal so that the terminal can better achieve balance between communication quality and system overheads in various application scenarios.

In the foregoing embodiment, the second judging module 901 determines whether the terminal is in a high-speed motion state. In an actual application process, there may be many manners for specifically determining whether the terminal is in a high-speed motion state.

Optionally, the second judging module 901 may be specifically configured to detect a speed value of the terminal by using a sensor; and when the speed value of the terminal is greater than a predetermined speed threshold, determine that the terminal is in the high-speed motion state.

Optionally, the second judging module 901 may be specifically configured to detect whether an offset of automatic frequency control of the terminal within a preset time length is greater than a predetermined offset; and when the offset of the automatic frequency control of the terminal within the preset time length is greater than the predetermined offset, determine that the terminal is in the high-speed motion state.

For ease of understanding of the foregoing embodiment, the following describes a process of interaction between the modules of the foregoing terminal in a specific application scenario.

A sensor in the second judging module 901 detects that a current speed value of the terminal is 250 KM/h, which is greater than a predetermined speed threshold 200 KM/h, and the second judging module 901 determines that a high-speed motion state is currently available and triggers the acquiring module 401;

the acquiring module 401 acquires signal strengths of a serving cell A and neighboring cells according to a predetermined time period of 1 second; and assuming that the acquiring starts from the $0^{th}$ second and a current time is the $8.2^{th}$ second, the acquiring module 401 has already acquired signal strengths that are at the $0^{th}$, $1^{st}$, $2^{nd}$, $3^{rd}$, $4^{th}$, $5^{th}$, $6^{th}$, $7^{th}$, and $8^{th}$ seconds and that are of the serving cell A and the neighboring cells;

the first determining module 402 selects four neighboring cells D, E, F, and G whose signal strengths at the $8^{th}$ second (a specific moment) are greater than a signal strength of the serving cell to form a candidate target cell set, where at the $8^{th}$ second, the signal strength of the serving cell A is −80 dBm, a signal strength of the neighboring cell D is −60 dBm, a signal strength of the neighboring cell E is −63 dBm, a signal strength of the neighboring cell F is −50 dBm, and a signal strength of the neighboring cell G is −62 dBm;

the second detection module 501 detects a signal change trend of the serving cell that is from the $3^{rd}$ second to the $8^{th}$ second (within a predetermined time length of 5 seconds); learns that a signal strength of the serving cell A at the $3^{rd}$ second is −45 dBm, a signal strength of the serving cell A at the $4^{th}$ second is −47 dBm, a signal strength of the serving cell A at the $5^{th}$ second is −50 dBm, a signal strength of the serving cell A at the $6^{th}$ second is −60 dBm, a signal strength of the serving cell A at the $7^{th}$ second is −70 dBm, and a signal strength of the serving cell A at the $8^{th}$ second is −80 dBm; and determines that the signal change trend of the serving cell from the $3^{rd}$ second to the $8^{th}$ second is a descending trend;

the first detection module 403 detects signal change trends that are from the $3^{rd}$ second to the $8^{th}$ second and that are of the neighboring cells in the candidate target cell set, and learns that from the $3^{rd}$ second to the $8^{th}$ second, a signal change trend of the neighboring cell D is an ascending trend, a signal change trend of the neighboring cell E is an ascending trend, a signal change trend of the neighboring cell F is a stable trend, and a signal change trend of the neighboring cell G is a descending trend;

when the second detection module 501 determines that the signal change trend of the serving cell from the $3^{rd}$ second to the $8^{th}$ second satisfies the descending trend, the first triggering module 502 triggers the second determining module 404, and the second determining module 404 determines that a neighboring cell (the neighboring cell D) whose signal strength is the greatest in a set of neighboring cells (the neighboring cell D and the neighboring cell E) whose signal change trends satisfy the ascending trend in the candidate target cell set is a target cell; and the reselection module 405 reselects the target cell (the neighboring cell D) as a serving cell.

Figure 10:
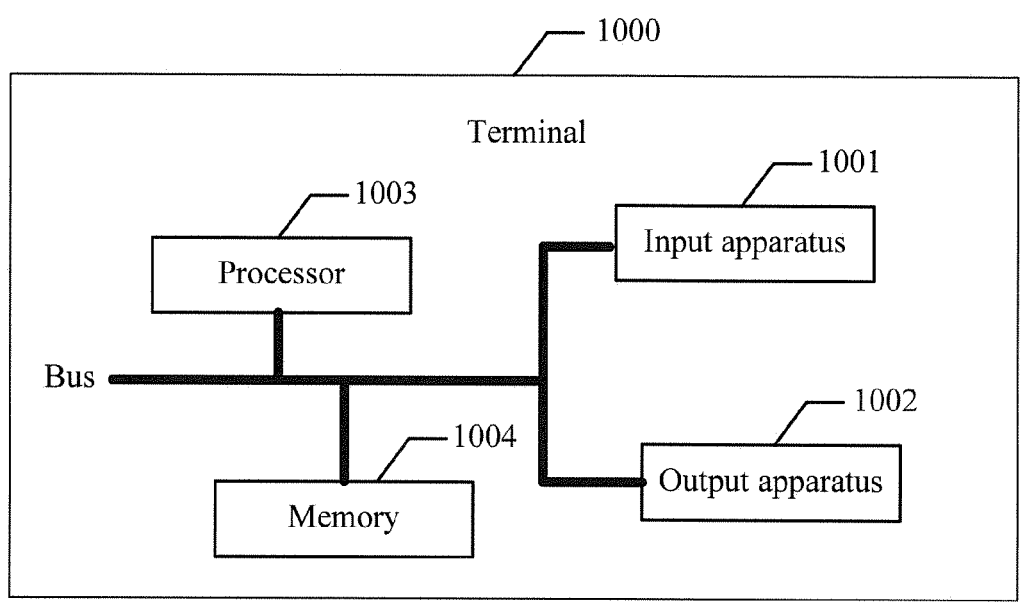
FIG. 10 is another schematic structural diagram of a terminal according to an embodiment of the present invention.

Referring to FIG. 10, another embodiment of a terminal 1000 in the embodiments of the present invention includes:

an input apparatus 1001, an output apparatus 1002, a processor 1003, and a memory 1004 (where there may be one or more processors 1003 in the terminal 1000, and one processor 1003 is used as an example in FIG. 10). In some embodiments of the present invention, the input apparatus 1001, the output apparatus 1002, the processor 1003, and the memory 1004 may be connected by using a bus or in another manner, and an example in which the input apparatus 1001, the output apparatus 1002, the processor 1003, and the memory 1004 are connected by using a bus is used in FIG. 10.

By invoking an operation instruction stored in the memory 1004, the processor 1003 is configured to perform the following steps:

acquiring signal strengths of a serving cell and signal strengths of neighboring cells according to a predetermined time period, where the serving cell is a cell on which the terminal currently camps, and the neighboring cells are cells from which the terminal can receive signals;

determining a candidate target cell set, where the candidate target cell set includes neighboring cells whose first strength parameters are greater than a first strength parameter of the serving cell at a specific moment, where the specific moment is a latest moment when a signal strength of the serving cell and signal strengths of the neighboring cells are acquired, and the first strength parameter is a signal strength or a strength parameter obtained by calculating according to a signal strength;

detecting signal change trends, which are within a predetermined time length before the specific moment, of the neighboring cells in the candidate target cell set;

determining that a neighboring cell in a set of neighboring cells whose signal change trends satisfy a first state in the candidate target cell set is a target cell, where the first state is a stable trend and/or an ascending trend; and reselecting the target cell as a serving cell.

In some embodiments of the present invention, the processor 1003 further performs the following step:

detecting a signal change trend, which is within the predetermined time length, of the serving cell.

In some embodiments of the present invention, the processor 1003 specifically performs the following step:

when determining that the signal change trend of the serving cell within the predetermined time length satisfies a second state, determining, by the terminal, that the neighboring cell in the set of neighboring cells whose signal change trends satisfy the first state in the candidate target cell set is the target cell, where the second state is a stable trend and/or a descending trend.

In some embodiments of the present invention, the processor 1003 further performs the following step:

when determining that the signal change trend of the serving cell within the predetermined time length does not satisfy the second state, waiting until a next predetermined time period to trigger the step of determining a candidate target cell set.

In some embodiments of the present invention, the processor 1003 further performs the following steps:

determining whether the candidate target cell set is an empty set; and when determining that the candidate target cell set is not an empty set, triggering the step of detecting signal change trends, which are within a predetermined time length before the specific moment, of the neighboring cells in the candidate target cell set; or when determining that the candidate target cell set is an empty set, waiting until the next predetermined time period to trigger the step of determining a candidate target cell set.

In some embodiments of the present invention, the processor 1003 specifically performs the following step:

determining that a neighboring cell whose second strength parameter is the greatest in the set of neighboring cells whose signal change trends satisfy the first state in the candidate target cell set is the target cell, where the second strength parameter is a signal strength or a strength parameter obtained by calculating according to a signal strength.

In some embodiments of the present invention, the processor 1003 specifically performs the following steps:

selecting a neighboring cell whose signal strength is the greatest from the candidate target cell set as a first neighboring cell;

determining whether a signal change trend of the first neighboring cell satisfies the first state; and when determining that the signal change trend of the first neighboring cell does not satisfy the first state, removing the first neighboring cell from the candidate target cell set to update the candidate target cell set, and re-triggering the step of selecting a neighboring cell whose signal strength is the greatest from the candidate target cell set as a first neighboring cell; or when determining that the first neighboring cell satisfies the first state, determining that the first neighboring cell is the target cell.

In some embodiments of the present invention, the processor 1003 further performs the following steps:

determining whether the terminal is in a high-speed motion state; and when determining that the terminal is in the high-speed motion state, triggering the step of acquiring signal strengths of a serving cell and signal strengths of neighboring cells according to a predetermined time period.

In some embodiments of the present invention, the processor 1003 specifically performs the following steps:

detecting a speed value of the terminal by using a sensor; and when determining that the speed value of the terminal is greater than a predetermined speed threshold, determining that the terminal is in the high-speed motion state.

In some embodiments of the present invention, the processor 1003 specifically performs the following steps:

detecting whether an offset of automatic frequency control of the terminal within a preset time length is greater than a predetermined offset; and when determining that the offset of the automatic frequency control of the terminal within the preset time length is greater than the predetermined offset, determining that the terminal is in the high-speed motion state.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for selecting a target cell, the method comprising:
    acquiring, by a terminal, signal strengths of a serving cell and signal strengths of neighboring cells according to a predetermined time period, wherein the serving cell is a cell on which the terminal currently camps, and the neighboring cells are cells from which the terminal can receive signals;
    determining, by the terminal, a candidate target cell set, wherein the candidate target cell set comprises neighboring cells whose first strength parameters are greater than a first strength parameter of the serving cell at a specific moment, wherein the specific moment is a latest moment when a signal strength of the serving cell and signal strengths of the neighboring cells are acquired, and the first strength parameter is a signal strength or a strength parameter obtained by calculating according to a signal strength;
    detecting, by the terminal, signal change trends, which are within a predetermined time length before the specific moment, of the neighboring cells in the candidate target cell set;
    determining, by the terminal, that a neighboring cell in a set of neighboring cells whose signal change trends satisfy a first state in the candidate target cell set is a target cell, wherein the first state is a stable trend and/or an ascending trend; and
    reselecting, by the terminal, the target cell as a serving cell.

2. The method according to claim 1, wherein:
    before determining, by the terminal, that a neighboring cell in a set of neighboring cells whose signal change trends satisfy a first state in the candidate target cell set is a target cell, the method further comprises:
        detecting, by the terminal, a signal change trend, which is within the predetermined time length, of the serving cell; and
    determining, by the terminal, that a neighboring cell in a set of neighboring cells whose signal change trends satisfy a first state in the candidate target cell set is a target cell comprises:
        when determining that the signal change trend of the serving cell within the predetermined time length satisfies a second state, determining, by the terminal, that the neighboring cell in the set of neighboring cells whose signal change trends satisfy the first state in the candidate target cell set is the target cell, wherein the second state is a stable trend and/or a descending trend.

3. The method according to claim 2, wherein after detecting, by the terminal, a signal change trend, which is within the predetermined time length, of the serving cell, the method further comprises:
    when determining that the signal change trend of the serving cell within the predetermined time length does not satisfy the second state, waiting, by the terminal, until a next predetermined time period to trigger the step of determining, by the terminal, a candidate target cell set.

4. The method according to claim 1, wherein after selecting, by the terminal, neighboring cells whose first strength parameters are greater than a first strength parameter of the serving cell at a specific moment to form a candidate target cell set, the method further comprises:
    determining, by the terminal, whether the candidate target cell set is an empty set; and
    when determining that the candidate target cell set is not an empty set, triggering the step of detecting, by the terminal, signal change trends, which are within a predetermined time length before the specific moment, of the neighboring cells in the candidate target cell set; or
    when determining that the candidate target cell set is an empty set, waiting, by the terminal, until the next predetermined time period to trigger the step of determining, by the terminal, a candidate target cell set.

5. The method according to claim 1, wherein determining, by the terminal, that a neighboring cell in a set of neighboring cells whose signal change trends satisfy a first state in the candidate target cell set is a target cell comprises:
    determining, by the terminal, that a neighboring cell whose second strength parameter is the greatest in the set of neighboring cells whose signal change trends satisfy the first state in the candidate target cell set is the target cell, wherein the second strength parameter is a signal strength or a strength parameter obtained by calculating according to a signal strength.

6. The method according to claim 5, wherein determining, by the terminal, that a neighboring cell whose second strength parameter is the greatest in the set of neighboring cells whose signal change trends satisfy the first state in the candidate target cell set is the target cell comprises:
  selecting, by the terminal, a neighboring cell whose signal strength is the greatest from the candidate target cell set as a first neighboring cell;
  determining, by the terminal, whether a signal change trend of the first neighboring cell satisfies the first state; and
  when determining that the signal change trend of the first neighboring cell does not satisfy the first state, removing the first neighboring cell from the candidate target cell set to update the candidate target cell set, and re-triggering the step of selecting, by the terminal, a neighboring cell whose signal strength is the greatest from the candidate target cell set as a first neighboring cell; or
  when determining that the first neighboring cell satisfies the first state, determining that the first neighboring cell is the target cell.

7. The method according to claim 1, wherein before acquiring, by a terminal, signal strengths of a serving cell and signal strengths of neighboring cells according to a predetermined time period, the method further comprises:
  determining, by the terminal, whether the terminal is in a high-speed motion state; and
  when determining that the terminal is in the high-speed motion state, triggering the step of acquiring, by a terminal, signal strengths of a serving cell and signal strengths of neighboring cells according to a predetermined time period.

8. The method according to claim 7, wherein determining, by the terminal, whether the terminal is in a high-speed motion state comprises:
  detecting, by the terminal, a speed value of the terminal by using a sensor; and
  when the speed value of the terminal is greater than a predetermined speed threshold, determining that the terminal is in the high-speed motion state.

9. The method according to claim 7, wherein determining, by the terminal, whether the terminal is in a high-speed motion state comprises:
  detecting, by the terminal, whether an offset of automatic frequency control of the terminal within a preset time length is greater than a predetermined offset; and
  when the offset of the automatic frequency control of the terminal within the preset time length is greater than the predetermined offset, determining that the terminal is in the high-speed motion state.

10. A terminal, comprising:
  an input apparatus, an output apparatus, a processor, and a memory, wherein by invoking one or more operation instructions stored in the memory, the processor is configured to perform the following:
    acquiring signal strengths of a serving cell and signal strengths of neighboring cells according to a predetermined time period, wherein the serving cell is a cell on which the terminal currently camps, and the neighboring cells are cells from which the terminal can receive signals;
    determining a candidate target cell set, wherein the candidate target cell set comprises neighboring cells whose first strength parameters are greater than a first strength parameter of the serving cell at a specific moment, wherein the specific moment is a latest moment when a signal strength of the serving cell and signal strengths of the neighboring cells are acquired, and the first strength parameter is a signal strength or a strength parameter obtained by calculating according to a signal strength;
    detecting signal change trends, which are within a predetermined time length before the specific moment, of the neighboring cells in the candidate target cell set;
    determining that a neighboring cell in a set of neighboring cells whose signal change trends satisfy a first state in the candidate target cell set is a target cell, wherein the first state is a stable trend and/or an ascending trend; and
    reselecting the target cell as a serving cell.

11. The terminal according to claim 10, wherein the processor is further configured to perform the following:
  detecting a signal change trend, which is within the predetermined time length, of the serving cell; and
  when determining that the signal change trend of the serving cell within the predetermined time length satisfies a second state, determining, by the terminal, that the neighboring cell in the set of neighboring cells whose signal change trends satisfy the first state in the candidate target cell set is the target cell, wherein the second state is a stable trend and/or a descending trend.

12. The terminal according to claim 11, wherein the processor is further configured to perform the following:
  when determining that the signal change trend of the serving cell within the predetermined time length does not satisfy the second state, waiting until a next predetermined time period to trigger the step of determining a candidate target cell set.

13. The terminal according to claim 10, wherein the processor is further configured to perform the following:
  determining whether the candidate target cell set is an empty set; and
  when determining that the candidate target cell set is not an empty set, triggering the step of detecting signal change trends, which are within a predetermined time length before the specific moment, of the neighboring cells in the candidate target cell set; or
  when determining that the candidate target cell set is an empty set, waiting until the next predetermined time period to trigger the step of determining a candidate target cell set.

14. The terminal according to claim 10, wherein the processor is configured to perform the following:
  determining that a neighboring cell whose second strength parameter is the greatest in the set of neighboring cells whose signal change trends satisfy the first state in the candidate target cell set is the target cell, wherein the second strength parameter is a signal strength or a strength parameter obtained by calculating according to a signal strength.

15. The terminal according to claim 14, wherein the processor is configured to perform the following:
  selecting a neighboring cell whose signal strength is the greatest from the candidate target cell set as a first neighboring cell;
  determining whether a signal change trend of the first neighboring cell satisfies the first state; and
  when determining that the signal change trend of the first neighboring cell does not satisfy the first state, removing the first neighboring cell from the candidate target cell set to update the candidate target cell set, and re-triggering the step of selecting a neighboring cell whose signal strength is the greatest from the candidate target cell set as a first neighboring cell; or when determining that the first neighboring cell satisfies the first state, determining that the first neighboring cell is the target cell.

16. The terminal according to claim 10, wherein the processor is further configured to perform the following:

determining whether the terminal is in a high-speed motion state; and when determining that the terminal is in the high-speed motion state, triggering the step of acquiring signal strengths of a serving cell and signal strengths of neighboring cells according to a predetermined time period.

17. The terminal according to claim 16, wherein the processor is configured to perform the following:

detecting a speed value of the terminal by using a sensor; and when determining that the speed value of the terminal is greater than a predetermined speed threshold, determining that the terminal is in the high-speed motion state.

18. The terminal according to claim 16, wherein the processor is configured to perform the following:

detecting whether an offset of automatic frequency control of the terminal within a preset time length is greater than a predetermined offset; and when determining that the offset of the automatic frequency control of the terminal within the preset time length is greater than the predetermined offset, determining that the terminal is in the high-speed motion state.

* * * * *